(12) United States Patent
de Montmorillon et al.

(10) Patent No.: US 7,889,960 B2
(45) Date of Patent: Feb. 15, 2011

(54) BEND-INSENSITIVE SINGLE-MODE OPTICAL FIBER

(75) Inventors: Louis-Anne de Montmorillon, Versailles (FR); Simon Richard, Villebon sur Yvette (FR); Denis Molin, Draveil (FR); David Boivin, Longjumeau (FR); Marianne Bigot-Astruc, Marcoussis (FR); Pierre Sillard, Le Chesnay (FR)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 12/436,484

(22) Filed: May 6, 2009

(65) Prior Publication Data
US 2009/0279836 A1 Nov. 12, 2009

Related U.S. Application Data

(60) Provisional application No. 61/101,337, filed on Sep. 30, 2008, provisional application No. 61/112,006, filed on Nov. 6, 2008, provisional application No. 61/112,374, filed on Nov. 7, 2008.

(30) Foreign Application Priority Data
May 6, 2008 (FR) .................................. 08 02503

(51) Int. Cl.
*G02B 6/036* (2006.01)
(52) U.S. Cl. ...................................... 385/127
(58) Field of Classification Search .................. 385/27, 385/127
See application file for complete search history.

(56) References Cited

U.S. PATENT DOCUMENTS 4,114,980 A 9/1978 Asam et al.

RE30,635 E 6/1981 Kuppers et al.

(Continued)

FOREIGN PATENT DOCUMENTS

DE 3700565 A1 7/1988

(Continued)

OTHER PUBLICATIONS

European Search Report in counterpart European Patent Application No. 06076957, dated Jan. 26, 2007.

(Continued)

*Primary Examiner*—Uyen-Chau N Le
*Assistant Examiner*—Hoang Tran
(74) *Attorney, Agent, or Firm*—Summa, Additon & Ashe, P.A.

(57) ABSTRACT

A single-mode optical fiber includes a central core, an intermediate cladding, a depressed trench, and an external optical cladding. The central core has a radius $r_1$ and a positive refractive index difference $\Delta n_1$ with the optical cladding. The intermediate cladding has a radius $r_2$ and a refractive index difference $\Delta n_2$ with the optical cladding, wherein $\Delta n_2$ is less than the central core's refractive index difference $\Delta n_1$. The depressed trench has a radius $r_3$ and a negative index difference $\Delta n_3$ with the optical cladding. The optical fiber has a nominal mode field diameter (MFD) between 8.6 microns and 9.5 microns at a wavelength of 1310 nanometers, and at a wavelength of 1550 nanometers, the optical fiber has bending losses less than 0.15 dB/turn for a radius of curvature of 5 millimeters and cable cut-off wavelengths of less than or equal to 1260 nanometers.

38 Claims, 2 Drawing Sheets

U.S. PATENT DOCUMENTS

| | | | |
|---|---|---|---|
| 4,314,833 A | 2/1982 | Kuppers |
| 4,385,802 A | 5/1983 | Blaszyk et al. |
| 4,641,917 A | 2/1987 | Glodis et al. |
| 4,750,806 A | 6/1988 | Biswas |
| 4,836,640 A | 6/1989 | Gartside, III et al. |
| 4,838,643 A | 6/1989 | Hodges et al. |
| 4,852,968 A | 8/1989 | Reed |
| 5,032,001 A | 7/1991 | Shang |
| 5,044,724 A | 9/1991 | Glodis et al. |
| 5,106,402 A | 4/1992 | Geittner et al. |
| 5,175,785 A | 12/1992 | Dabby |
| 5,235,660 A | 8/1993 | Perry et al. |
| 5,448,674 A | 9/1995 | Vengsarkar et al. |
| 5,491,581 A | 2/1996 | Roba |
| 5,555,340 A | 9/1996 | Onishi et al. |
| 5,574,816 A | 11/1996 | Yang et al. |
| 5,586,205 A | 12/1996 | Chen et al. |
| 5,673,354 A | 9/1997 | Akasaka et al. |
| 5,717,805 A | 2/1998 | Stulpin |
| 5,721,800 A | 2/1998 | Kato et al. |
| 5,761,362 A | 6/1998 | Yang et al. |
| 5,802,236 A | 9/1998 | DiGiovanni et al. |
| 5,851,259 A | 12/1998 | Clayton et al. |
| 5,852,690 A | 12/1998 | Haggans et al. |
| 5,911,023 A | 6/1999 | Risch et al. |
| 5,917,109 A | 6/1999 | Berkey |
| 5,946,439 A | 8/1999 | Terasawa et al. |
| 5,963,700 A | 10/1999 | Kato et al. |
| 5,966,490 A | 10/1999 | Minns et al. |
| 5,982,968 A | 11/1999 | Stulpin |
| 6,035,087 A | 3/2000 | Bonicel et al. |
| 6,066,397 A | 5/2000 | Risch et al. |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,181,858 B1 | 1/2001 | Kato et al. |
| 6,185,353 B1 | 2/2001 | Yamashita et al. |
| 6,210,802 B1 | 4/2001 | Risch et al. |
| 6,215,931 B1 | 4/2001 | Risch et al. |
| 6,266,467 B1 | 7/2001 | Kato et al. |
| 6,280,850 B1 | 8/2001 | Oh et al. |
| 6,314,224 B1 | 11/2001 | Stevens et al. |
| 6,317,551 B1 | 11/2001 | Mitchell et al. |
| 6,321,012 B1 | 11/2001 | Shen |
| 6,321,014 B1 | 11/2001 | Overton et al. |
| 6,334,016 B1 | 12/2001 | Greer, IV |
| 6,334,019 B1 | 12/2001 | Birks et al. |
| 6,360,046 B1 | 3/2002 | Sasaoka et al. |
| 6,381,390 B1 | 4/2002 | Hutton et al. |
| 6,396,987 B1 | 5/2002 | de Montmorillon et al. |
| 6,415,089 B2 | 7/2002 | Kato et al. |
| 6,422,042 B1 | 7/2002 | Berkey |
| 6,424,776 B1 | 7/2002 | Nouchi et al. |
| 6,466,721 B1 | 10/2002 | Tsukitani et al. |
| 6,477,305 B1 | 11/2002 | Berkey et al. |
| 6,490,396 B1 | 12/2002 | Smith |
| 6,493,491 B1 | 12/2002 | Shen et al. |
| 6,510,268 B1 | 1/2003 | de Montmorillon et al. |
| 6,529,666 B1 | 3/2003 | Dultz et al. |
| 6,530,244 B1 | 3/2003 | Oh et al. |
| 6,535,665 B1 * | 3/2003 | Kim et al. ............... 385/28 |
| 6,535,676 B1 | 3/2003 | de Montmorillon et al. |
| 6,542,683 B1 | 4/2003 | Evans et al. |
| 6,587,623 B1 | 7/2003 | Papen et al. |
| 6,603,908 B2 | 8/2003 | Dallas et al. |
| 6,603,913 B1 | 8/2003 | Okuno |
| 6,618,538 B2 | 9/2003 | Nechitailo et al. |
| 6,647,190 B2 | 11/2003 | Matsuo et al. |
| 6,650,814 B2 | 11/2003 | Caplen et al. |
| 6,658,184 B2 | 12/2003 | Bourget et al. |
| 6,658,190 B2 | 12/2003 | Hirano et al. |
| 6,671,442 B2 | 12/2003 | Wang et al. |
| 6,687,440 B2 | 2/2004 | Balestra et al. |
| 6,687,445 B2 | 2/2004 | Carter et al. |
| 6,694,079 B1 | 2/2004 | Matsuo et al. |
| 6,744,959 B2 | 6/2004 | Takahashi |
| 6,749,446 B2 | 6/2004 | Nechitailo |
| 6,751,389 B2 * | 6/2004 | Tirloni ............... 385/127 |
| 6,754,425 B2 | 6/2004 | Jeon et al. |
| 6,771,865 B2 | 8/2004 | Blaszyk et al. |
| 6,804,441 B2 | 10/2004 | Arai et al. |
| 6,819,848 B2 | 11/2004 | Takahashi |
| 6,856,744 B2 | 2/2005 | Kumano |
| 6,859,599 B2 | 2/2005 | Mukasa |
| 6,879,764 B2 | 4/2005 | Changdar et al. |
| 6,885,802 B2 | 4/2005 | Oliveti et al. |
| 6,901,196 B2 | 5/2005 | Takahashi et al. |
| 6,901,197 B2 | 5/2005 | Hasegawa et al. |
| 6,904,218 B2 | 6/2005 | Sun et al. |
| 6,904,772 B2 | 6/2005 | Berkey et al. |
| 6,912,347 B2 | 6/2005 | Rossi et al. |
| 6,917,740 B2 | 7/2005 | Boek et al. |
| 6,917,743 B2 | 7/2005 | Honma et al. |
| 6,922,515 B2 | 7/2005 | Nechitailo et al. |
| 6,928,211 B2 | 8/2005 | Tanigawa et al. |
| 6,928,839 B2 | 8/2005 | Bilinov |
| 6,941,049 B2 | 9/2005 | Risch et al. |
| 6,941,054 B2 | 9/2005 | Tirloni et al. |
| 6,952,519 B2 | 10/2005 | Bickham et al. |
| 6,959,137 B2 | 10/2005 | Kalish et al. |
| 6,985,662 B2 | 1/2006 | Bickham |
| 7,008,696 B2 | 3/2006 | Kim et al. |
| 7,045,010 B2 | 5/2006 | Sturman, Jr. |
| 7,072,552 B2 | 7/2006 | Manyam et al. |
| 7,095,940 B2 | 8/2006 | Hayami et al. |
| 7,162,128 B2 | 1/2007 | Lovie et al. |
| 7,164,835 B2 | 1/2007 | Matsuo et al. |
| 7,171,074 B2 | 1/2007 | DiGiovanni et al. |
| 7,171,090 B2 | 1/2007 | Mattingly, III et al. |
| 7,187,833 B2 | 3/2007 | Mishra |
| 7,228,040 B2 | 6/2007 | Nakajima et al. |
| 7,239,784 B2 | 7/2007 | Hayami et al. |
| 7,254,305 B2 | 8/2007 | Mishra |
| 7,272,289 B2 | 9/2007 | Bickham et al. |
| 7,283,714 B1 | 10/2007 | Gapontsev et al. |
| 7,292,762 B2 | 11/2007 | Guan et al. |
| 7,295,741 B2 | 11/2007 | Sako et al. |
| 7,315,677 B1 | 1/2008 | Li et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,366,386 B2 | 4/2008 | Sako et al. |
| 7,366,387 B2 | 4/2008 | Matsuo et al. |
| 7,433,566 B2 | 10/2008 | Bookbinder et al. |
| 7,440,663 B2 | 10/2008 | Matsuo et al. |
| 7,440,665 B2 | 10/2008 | Hasegawa |
| 7,444,838 B2 | 11/2008 | Pickrell et al. |
| 7,450,806 B2 | 11/2008 | Bookbinder et al. |
| 7,450,807 B2 | 11/2008 | Bickham et al. |
| 7,483,613 B2 | 1/2009 | Bigot-Astruc et al. |
| 7,505,660 B2 | 3/2009 | Bickham et al. |
| 7,515,795 B2 | 4/2009 | Overton |
| 7,526,166 B2 | 4/2009 | Bookbinder et al. |
| 7,555,186 B2 | 6/2009 | Flammer et al. |
| 7,555,187 B2 | 6/2009 | Bickham et al. |
| 7,567,742 B2 | 7/2009 | Pickrell et al. |
| 7,574,088 B2 | 8/2009 | Sugizaki et al. |
| 7,587,111 B2 | 9/2009 | de Montmorillon et al. |
| 7,620,282 B2 | 11/2009 | Bickham |
| 7,623,747 B2 | 11/2009 | de Montmorillon |
| 2002/0031317 A1 | 3/2002 | Tsukitani et al. |
| 2002/0061175 A1 | 5/2002 | Matsuo et al. |
| 2002/0122644 A1 | 9/2002 | Birks et al. |

| | | | |
|---|---|---|---|
| 2003/0081921 A1 | 5/2003 | Sillard et al. | |
| 2003/0142938 A1 | 7/2003 | Koyano et al. | |
| 2003/0152349 A1 | 8/2003 | Lauzon et al. | |
| 2003/0190128 A1 | 10/2003 | Jang et al. | |
| 2003/0210878 A1 | 11/2003 | Kumano et al. | |
| 2003/0231847 A1 | 12/2003 | Varner et al. | |
| 2004/0033039 A1 | 2/2004 | Oliveti et al. | |
| 2004/0086245 A1 | 5/2004 | Farroni et al. | |
| 2005/0244120 A1 | 11/2005 | Mishra | |
| 2006/0115224 A1 | 6/2006 | Kutami et al. | |
| 2006/0140560 A1 | 6/2006 | Allen et al. | |
| 2007/0003198 A1 | 1/2007 | Gibson et al. | |
| 2007/0003199 A1 | 1/2007 | Mattingly et al. | |
| 2007/0019915 A1 | 1/2007 | Overton et al. | |
| 2007/0053642 A1 | 3/2007 | Mishra | |
| 2007/0104437 A1 | 5/2007 | Bookbinder et al. | |
| 2007/0127878 A1 | 6/2007 | de Montmorillon et al. | |
| 2007/0147756 A1 | 6/2007 | Matsuo et al. | |
| 2007/0183726 A1 | 8/2007 | Nothofer et al. | |
| 2007/0196061 A1 | 8/2007 | Bickham et al. | |
| 2007/0258686 A1 | 11/2007 | de Montmorillon et al. | |
| 2007/0263960 A1 | 11/2007 | Lock et al. | |
| 2007/0280615 A1 | 12/2007 | de Montmorillon et al. | |
| 2008/0013905 A1 | 1/2008 | Bookbinder et al. | |
| 2008/0037942 A1 | 2/2008 | Tatat | |
| 2008/0056654 A1 | 3/2008 | Bickham et al. | |
| 2008/0056658 A1 | 3/2008 | Bickham et al. | |
| 2008/0124028 A1 | 5/2008 | Bickham et al. | |
| 2008/0145010 A1 | 6/2008 | Overton et al. | |
| 2008/0152288 A1 | 6/2008 | Flammer | |
| 2008/0166094 A1 | 7/2008 | Bookbinder et al. | |
| 2008/0181564 A1 | 7/2008 | Overton et al. | |
| 2008/0226241 A1 | 9/2008 | Sugizaki et al. | |
| 2008/0292262 A1 | 11/2008 | Overton et al. | |
| 2008/0304800 A1 | 12/2008 | Bickham et al. | |
| 2008/0317410 A1 | 12/2008 | Griffioen et al. | |
| 2009/0003781 A1 | 1/2009 | Parris et al. | |
| 2009/0003785 A1 | 1/2009 | Parris et al. | |
| 2009/0041414 A1 | 2/2009 | Lavenne et al. | |
| 2009/0060437 A1 | 3/2009 | Fini et al. | |
| 2009/0126407 A1 | 5/2009 | Bookbinder et al. | |
| 2009/0154888 A1 | 6/2009 | Abbott, III et al. | |
| 2009/0169163 A1 | 7/2009 | Abbott, III et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0263092 A1 | 10/2009 | Flammer et al. | |
| 2009/0279835 A1 | 11/2009 | de Montmorillon et al. | |
| 2009/0279836 A1 | 11/2009 | de Montmorillon et al. | |
| 2010/0021117 A1 | 1/2010 | de Montmorillon | |
| 2010/0067859 A1 | 3/2010 | de Montmorillon | |
| 2010/0119202 A1 | 5/2010 | Overton | |

FOREIGN PATENT DOCUMENTS

| | | | |
|---|---|---|---|
| EP | 0059564 | | 9/1982 |
| EP | 0327702 | A2 | 8/1989 |
| EP | 0848266 | A1 | 6/1998 |
| EP | 0991967 | A1 | 4/2000 |
| EP | 1116972 | A1 | 7/2001 |
| EP | 1398653 | A1 | 3/2004 |
| EP | 1443347 | A2 | 8/2004 |
| EP | 1698920 | A1 | 9/2006 |
| EP | 1762867 | | 3/2007 |
| EP | 1785754 | A1 | 5/2007 |
| EP | 1845399 | A1 | 10/2007 |
| EP | 1930753 | A1 | 6/2008 |
| EP | 2116877 | A1 | 11/2009 |
| EP | 2116878 | A1 | 11/2009 |
| GB | 2228585 | A | 8/1990 |
| JP | 06-196778 | | 7/1994 |
| JP | 09-048629 | | 2/1997 |
| JP | 09-218319 | | 8/1997 |
| JP | 09-311231 | | 12/1997 |
| JP | 2006-133314 | | 5/2006 |
| WO | 99/00685 | A1 | 1/1999 |
| WO | 00/14580 | A1 | 3/2000 |
| WO | 01/27667 | A2 | 4/2001 |
| WO | 01/47822 | A1 | 7/2001 |
| WO | 02/12931 | A2 | 2/2002 |
| WO | 0212931 | A2 | 2/2002 |
| WO | 02/29459 | A1 | 4/2002 |
| WO | 0239159 | A1 | 5/2002 |
| WO | 03107054 | A1 | 12/2003 |
| WO | 2004/027941 | | 4/2004 |
| WO | 2004/092794 | A1 | 10/2004 |
| WO | 2004109352 | A1 | 12/2004 |
| WO | 2006/090519 | | 8/2006 |
| WO | 2007/013923 | A2 | 2/2007 |
| WO | 2008/027351 | A2 | 3/2008 |
| WO | 2008027351 | A2 | 3/2008 |
| WO | 2009/062131 | A1 | 5/2009 |
| WO | 2009/064381 | A1 | 5/2009 |

OTHER PUBLICATIONS

European Office Action in counterpart European Patent Application No. 06076957, dated Nov. 2, 2007.

Matsuo et al., "Bend-Insensitive and Low Splice-Loss Optical Fiber for Indoor Wiring in FTTH", OFC'04 Proceedings, paper Th13 (2004).

Sakabe et al., "Enhanced Bending Loss Insensitive Fiber and New Cables for CWDM Access Networks", 53rd IWCS Proceedings, pp. 112-118 (2004).

Bandou et al., "Development of Premises Optical Wiring Components Using Hole-Assisted Fiber" 53rd IWCS Proceedings, pp. 119-122 (2004).

Yokokawa et al., "Ultra-Low Loss and Bend Insensitive Pure-silica-core Fiber Complying with G.652 C/D and its Applications to a Loose Tube Cable", 53rd IWCS Proceedings, pp. 150-155 (2004).

Matsuo et al., "Low-Bending-Loss and Low-Splice-Loss Single-Mode Fibers Employing a Trench Index Profile", IEICE Trans. Electron., vol. E88-C, No. 5, pp. 889-895, May 2005.

Unger et al., "Low-loss Single mode Fibre with reduced inner cladding", OFC 1987 Post deadline paper.

De Montmorillon et al., "Bend-Optimized G.652D Compatible Trench-Assisted Single Mode Fibers", IWCS, Proceedings of the 55th IWCS/Focus, pp. 342-347, Providence, RI, (Nov. 2006).

U.S. Appl. No. 60/841,490 filed on Aug. 31, 2006.

U.S. Appl. No. 60/879,702 filed on Jan. 10, 2007.

U.S. Appl. No. 60,841,458 filed on Aug. 31, 2006.

U.S. Appl. No. 60/861,776 filed on Nov. 29, 2006.

Jeunhomme, "Single-Mode Fiber Optics, Principles and Applications, Second Edition, Revised and Expanded", pp. 38-49.

Allard, et al., "Bending loss of a single-mode triangular-index fiber with a depressed cladding ring by a vector mode method", SPIE vol. 1792 (1992), 66. 146-155.

Allard, et al., "Bending-loss studies of a single-mode triangular-index fiber with a depressed cladding ring with a vector-mode method", Applied Optics, vol. 33, No. 33, Nov. 20, 1994, pp. 7725-7732.

Yip, et al, "Dispersion Studies of a Single-Mode Triangular-Core Fiber with a Trench by the Vector Mode Analysis", 1989 IEEE MTT-S Digest, pp. 1175-1178.

Yip et al., "Dispersion studies of a single-mode triangular-index fiber with a trench by the vector mode analysis", Applied Optics, vol. 29, No. 36, Dec. 20, 1990, pp. 5343-5352.

Bing et al., "Low-loss Holey Fiber", Hitachi Cable Review No. 24, Aug. 2005, pp. 1-5.

S. Matsuo et al., "Low-Bending-Loss and Low-Splice-Loss Single-Mode Fibers Employing a Trench Index Profile", Journal of Lightwave Technology, Vo. 23 n. 11, pp. 3494-3499, (2005).

K. Himeno et al., "Low-Bending-Loss Single Mode Fibers for Fiber-To-The Home", Journal of Lightwave Technology, vol. 23, No. 11, pp. 3494-3499, (2005).

T. Hasegawa et al., "Bend-Insensitive Single-Mode Holey Fiber with SMF-Compatibility for Optical Wiring Applications", Proceedings ECOC'03, paper We2.7.3, Rimini, Italy, (2003).

D. Nishioka et al., "Development of Holey Fiber Supporting Extra-Small Diameter Bending," SEI Technical Review, No. 58, pp. 42-47, (2004).

K. Miyake et al., "Bend Resistant Photonic Crystal Fiber Compatible with Conventional Single Mode Fiber," Proceedings ECOC'04, paper Mo3.3.4, Stockholm, Sweden, (2004).

Y. Tsuchida et al., "Design and Characterization of Single-Mode Holey Fibers with Low Bending Losses", Optics Express, vol. 13, No. 12, pp. 4470-4479, (2005).

K. Ohsono et al., "High Performance Optical Fibers for Next Generation Transmission Systems," Hitachi Cable Review, No. 22, pp. 1-5, (2003).

K. Nakajima et al., "Hole-Assisted Fiber Design for Small Bending and Splice Loss," IEEE Photonics Technology Letters, vol. 15, No. 12, pp. 1737-1739, (2003).

K. Ieda et al., "Transmission Characteristics of a Hole-Assisted Fiber Cord for Flexible Optical Wiring," Proceedings 54th IWCS, pp. 63-68, (2005).

N. Guan et al., "Hole-Assisted Single Mode Fibers for Low Bending Loss," Proceedings ECOC'04, paper M03.3.5, Stockholm, Sweden, (2004).

European Search Report and Written Opinion in commonly owned European Application No. 07006909, dated Jul. 7, 2007.

French Search Report and Written Opinion in commonly owned French Application No. 0603128, dated Jul. 20, 2006.

Botineau, J. et al, "Effective Stimulated Brillouin Gain in Single Mode Optical Fibers," Electronics Letters, vol. 31, No. 23, (Nov. 9, 1995).

Yoshizawa, N. et al., "Stimulated Brillouin Scattering Suppression by Means of Applying Strain Distribution to Fiber with Cabling," IEEE JLT, vol. 11, No. 10, pp. 1518-1522, (1993).

U.S. Appl. No. 61/101,337, filed Sep. 30, 2008 [Cited in Specification].

U.S. Appl. No. 61/112,006, filed Nov. 6, 2008 [Cited in Specification].

U.S. Appl. No. 61/112,374, filed Nov. 7, 2008 [Cited in Specification].

U.S. Appl. No. 60/986,737, filed Nov. 9, 2007 [Cited in Specification].

U.S. Appl. No. 61/041,484, filed Apr. 1, 2008 [Cited in Specification].

U.S. Appl. No. 61/112,595 filed Nov. 7, 2008 [Cited in Specification].

European Search Report in commonly owned European Application No. 09006121, dated Jul. 30, 2009.

European Search Report in counterpart European Application No. 09006117, dated Jul. 30, 2009.

French Search Report in counterpart French Application No. 0802503, dated Dec. 11, 2008.

Zheng et al., "Measurement and System Impact of Multipath Interference From Dispersion Compensating Fiber Modules," IEEE Transactions on Instrumentation and Measurement, vol. 53, No. 1, Feb. 2004.

Ramachandran et al., "Measurement of Multipath Interference in the Coherent Crosstalk Regime," IEE Photonics Technology Letters, vol. 15, No. 8, Aug. 2003.

U.S. Appl. No. 12/098,804, filed Nov. 7, 2008 [Cited in Specification].

* cited by examiner

US 7,889,960 B2

BEND-INSENSITIVE SINGLE-MODE OPTICAL FIBER

CROSS-REFERENCE TO PRIORITY APPLICATIONS

This application claims the benefit of pending French Application Ser. No. 08/02503 for "Fibre Optique Monomode" (filed May 6, 2008, at the French Patent Office), which is hereby incorporated by reference in its entirety.

This application further claims the benefit of U.S. Patent Application No. 61/101,337 for a "Bend-Insensitive Optical Fiber" (filed Sep. 30, 2008), U.S. Patent Application No. 61/112,006 for a "Bend-Insensitive Single-Mode Optical Fiber" (filed Nov. 6, 2008), and U.S. Patent Application No. 61/112,374 for a "Bend-Insensitive Single-Mode Optical Fiber" (filed Nov. 7, 2008), each of which is incorporated by reference in their entirety.

FIELD OF THE INVENTION

The present invention relates to the field of optical fiber transmissions, and more specifically, to an optical fiber having greatly reduced bending losses.

BACKGROUND OF THE INVENTION

For optical fibers, the refractive index profile is generally set forth in terms of the difference in value between two points on the graph of the function associating the refractive index with the radius of the fiber. Conventionally, the distance r to the center of the fiber is shown along the x-axis of the profile. The difference between the refractive index at distance r and the refractive index of the external fiber cladding is shown along the y-axis (FIG. 2, references 21-24). The external cladding functions as an optical cladding and has a substantially constant refractive index. This optical cladding is generally composed of pure silica but can also contain one or more dopants. The optical fiber refractive index profile is referred to as a "step" profile, a "trapezoidal" profile, or a "triangular" profile for graphs having the respective shapes of a step, a trapezoid, or a triangle. These curves are generally representative of the theoretical or reference index profile (i.e., set profile) of the fiber. Fiber manufacturing constraints may lead to a slightly different profile in the actual fiber.

An optical fiber is conventionally composed of (i) an optical core, having the function of transmitting and optionally amplifying an optical signal, and (ii) an optical cladding, having the function of confining the optical signal in the core. For this purpose, the refractive indexes of the core ($n_c$) and of the cladding ($n_g$) are such that $n_c > n_g$. As is well known in the art, the propagation of an optical signal in a single-mode optical fiber is broken down into a fundamental mode (known as LP01) guided in the core, and into secondary modes guided over a certain radius in the core-cladding assembly.

Conventionally, step-index fibers, also called SMF fibers ("Single Mode Fibers") are used as line fibers for optical fiber transmission systems. These fibers exhibit a chromatic dispersion and a chromatic dispersion slope corresponding to specific telecommunication recommended standards.

For the requirements of compatibility between the optical systems from different manufacturers, the International Telecommunication Union (ITU) has defined a recommended standard with a norm, referenced ITU-T G.652, which must be met by a Standard Single Mode Fiber (SSMF).

This G.652 recommendation for transmission fibers recommends inter alia, a nominal range of 8.6 microns (μm) to 9.5 microns (μm) for the Mode Field Diameter (MFD) at a wavelength of 1310 nanometers, which can vary with +/−0.4 micron (μm) due to manufacturing tolerances; a maximum of 1260 nanometers for the cable cut-off wavelength; a range of 1300 nanometers to 1324 nanometers for the dispersion cancellation wavelength (denoted $\lambda_0$); and a maximum chromatic dispersion slope of 0.092 ps/(nm²·km) (i.e., ps/nm²/km).

The cable cut-off wavelength is conventionally measured as the wavelength at which the optical signal is no longer single mode after propagation over 22 meters of fiber, such as defined by Subcommittee 86A of the International Electrotechnical Commission in the IEC 60793-1-44 standard.

In most cases, the secondary mode most resistant to bending losses is the LP11 mode. The cable cut-off wavelength is, therefore, the wavelength beyond which the LP11 mode is sufficiently weakened after propagation over 22 meters of fiber. The method proposed by the standard involves considering that the optical signal is single mode when the attenuation of the LP11 mode is greater than or equal to 19.3 dB.

Moreover, for a given optical fiber, a so-called MAC value is defined as the ratio of the mode field diameter of the fiber at 1550 nanometers over the effective cut-off wavelength $\lambda_{ceff}$. The cut-off wavelength is conventionally measured as the wavelength at which the optical signal is no longer single mode after propagation over two meters of fiber, as defined by Subcommittee 86A of the International Electrotechnical Commission in the IEC 60793-1-44 standard. The MAC constitutes a parameter for assessing the performances of the fiber, in particular for finding a compromise between the mode field diameter, the effective cut-off wavelength, and the bending losses.

Commonly assigned U.S. Patent Application Publication No. US2007/0280615 (and its counterpart European Patent Application No. 1,845,399) and commonly assigned U.S. Patent Application Publication No. US2007/0127878 (and its counterpart European Patent Application No. 1,785,754) disclose a relationship between the value of the MAC at a wavelength of 1550 nanometers and the bending losses at a wavelength of 1625 nanometers with a radius of curvature of 15 millimeters in a standard step-index fiber (SSMF). Each of these published patent applications is hereby incorporated by reference in its entirety.

Furthermore, each application establishes that the MAC influences the bending losses of the fiber and that reducing the MAC value reduces these bending losses. Reducing the mode field diameter and/or increasing the effective cut-off wavelength reduces the MAC value but may lead to noncompliance with the G.652 recommendation, making the fiber commercially incompatible with some transmission systems.

The reduction of the bending losses, while retaining certain optical transmission parameters, constitutes a challenge for Fiber-To-The-Home (FTTH) applications.

The International Telecommunications Union (ITU) has also defined recommended standards referenced ITU-T G.657A and ITU-T G.657B, which must be met by the optical fibers intended for FTTH applications, particularly in terms of resistance to bending losses. The G.657A recommendation imposes limits on values for bending losses but seeks, above all, to preserve compatibility with the G.652 recommendation, particularly in terms of mode field diameter (MFD) and chromatic dispersion. On the other hand, the G.657B recommendation imposes strict bending loss limits, particularly (i) bending losses less than 0.003 dB/turn at a wavelength of 1550 nanometers for a radius of curvature of 15 millimeters, and (ii) bending losses less than 0.01 dB/turn at a wavelength of 1625 nanometers for a radius of curvature of 15 millimeters.

U.S. Patent Application Publication No. US2007/0280615 (and its counterpart European Patent Application No. 1,845, 399) and U.S. Patent Application Publication No. US2007/0127878 (and its counterpart European Patent Application No. 1,785,754) propose fiber profiles having limited bending losses, corresponding in particular to the criteria of the G.657A and G.657B recommendations. The profiles described in these European patent applications, however, make it possible to achieve only the bending loss limits imposed by the G.657B recommendation.

U.S. Pat. No. 7,164,835 and U.S. Pat. No. 7,440,663, each of which is hereby incorporated by reference in its entirety, also describe fiber profiles exhibiting limited bending losses. The disclosed fibers, however, correspond only to the criteria of the G.657A and G.657B recommendations, particularly in terms of mode field diameter and chromatic dispersion.

For certain applications, the reduction of the bending losses is essential, especially when the fiber is intended to be stapled or coiled in a miniaturized optical box.

Hole-assisted fiber technology makes it possible to achieve excellent performances with respect to bending losses, but this technology is complex and expensive to implement and cannot be used for fibers intended for low-cost FTTH systems.

Draka Comteq markets bend-insensitive optical fibers having good resistance to bending losses under the trade name BendBright$^{XS}$®. These optical fibers, which are fully compliant with the ITU-T G.652 and G.657B recommendations, exhibit typical bend losses of 0.3 dB/turn at 5-millimeter radius of curvature at 1550 nanometers. Even so, a need exists for an optical fiber having typical resistance to bending losses that is even better for the 5-mm radius of curvature.

An optical fiber meeting this criterion should also remain fully compliant with the G.652 recommendation in terms of transmission profile and, in particular, mode field diameter and cable cut-off. This appreciable improvement of bending losses may be achieved to the detriment of a higher cut-off wavelength, provided that (i) the directly higher order LP11 mode is sufficiently attenuated, and (ii) the length of fiber required for the attenuation of the LP11 mode to reach 19.3 dB at a wavelength of 1260 nanometers is less than 22 meters, thus ensuring cable cut-off of 1260 nanometers or less. The fiber meeting this criterion should also remain fully compliant with the G.657B recommendation.

SUMMARY OF THE INVENTION

Accordingly, the present invention includes a fiber with a central core, an intermediate cladding, and a depressed trench that is surrounded by an external optical cladding. The refractive index profile improves the bending losses by a factor of ten relative to the constraints imposed by the G.657B recommendation, while retaining a mode field diameter compatible with the G.652 recommendation and ensuring a sufficient attenuation of the LP11 mode.

In particular, the surface of the core, as well as the surface and the volume of the depressed trench, are designed to considerably improve the bending losses. In the context of the present invention, the surface of the core or the surface of the depressed trench should not extend geometrically but should correspond to values taking into account two dimensions—the product of the radius and the refractive index difference. Similarly, the volume of the depressed trench corresponds to a value taking into account three dimensions—the product of the square of the radius and the refractive index difference.

The invention embraces, more particularly, a single-mode optical fiber, including, from the center toward the periphery, a central core, an intermediate cladding, a depressed trench, and an external optical cladding. The central core has a radius $r_1$ and a positive refractive index difference $\Delta n_1$ with the external optical cladding. The intermediate cladding has a radius $r_2$ and a refractive index difference $\Delta n_2$ with the external optical cladding. The refractive index difference $\Delta n_2$ is less than the core's refractive index difference $\Delta n_1$. The depressed trench has a radius $r_3$ and a negative refractive index difference $\Delta n_3$ with the external optical cladding.

The present optical fiber possesses (i) a nominal mode field diameter (MFD) between about 8.6 microns (µm) and 9.5 microns (µm) at a wavelength of 1310 nanometers, and (ii) bending losses less than about 0.15 dB/turn for a radius of curvature of 5 millimeters at a wavelength of 1550 nanometers and a cable cut-off wavelength of less than or equal to about 1260 nanometers, measured as the wavelength at which the attenuation of the LP11 mode is greater than or equal to 19.3 dB after propagation over 22 meters of fiber, the fiber being either straight conditioned or conditioned around a 140-millimeter curvature radius mandrel.

According to one fiber embodiment, the surface integral of the central core ($V_{01}$), defined as $$V_{01} = \int_0^{r1} \Delta n(r) \cdot dr \approx r_1 \times \Delta n_1,$$

is between about $19.0 \times 10^{-3}$ micron and $23.0 \times 10^{-3}$ micron, typically between about $20.0 \times 10^{-3}$ micron and $23.0 \times 10^{-3}$ micron. In another embodiment, the surface integral of the central core ($V_{01}$) is between about $20.0 \times 10^{-3}$ micron and $21.5 \times 10^{-3}$ micron, which gives rise to outstanding optical properties.

According to another fiber embodiment, the surface integral of the depressed trench ($V_{03}$), defined as $$V_{03} = \int_{r2}^{r3} \Delta n(r) \cdot dr \approx (r_3 - r_2) \times \Delta n_3,$$

is between about $-55.0 \times 10^{-3}$ micron and $-30.0 \times 10^{-3}$ micron. In another embodiment, the surface integral of the depressed trench ($V_{03}$) is between about $-42.5 \times 10^{-3}$ micron and $-32.5 \times 0-3$ micron, which gives rise to outstanding optical properties.

According to yet another fiber embodiment, the volume integral of the depressed trench ($V_{13}$), defined as, $$V_{13} = 2 \cdot \int_{r2}^{r3} \Delta n(r) \cdot r \cdot dr \approx (r_3^2 - r_2^2) \times \Delta n_3,$$

is between about $-1200 \times 10^{-3}$ µm$^2$ and $-750 \times 10^{-3}$ µm$^2$. In another embodiment, the volume integral of the depressed trench ($V_{13}$) is between about $-1000 \times 10^{-3}$ µm$^2$ and $-750 \times 10^{-3}$ µm$^2$, which gives rise to outstanding optical properties.

In exemplary embodiments, the fiber has physical properties and operational parameters with improved resistance to bending losses. For instance, the fiber has an effective cut-off wavelength $\lambda_{ceff}$ greater than about 1300 nanometers, the effective cut-off wavelength being measured as the wavelength at which the optical signal becomes single mode after propagation over two meters of fiber. The fiber has, for a wavelength of 1550 nanometers, bending losses less than or equal to about 0.003 dB/turn for a radius of curvature of 15 millimeters, bending losses less than or equal to about $3\times10^{-2}$ dB/turn, typically less than about $7.5\times10^{-3}$ dB/turn, for a radius of curvature of 10 millimeters, bending losses less than or equal to about 0.05 dB/turn for a radius of curvature of 7.5 millimeters, and bending losses less than about 0.15 dB/turn, typically less than about 0.10 dB/turn, for a radius of curvature of 5 millimeters.

The fiber disclosed herein also shows reduced bending losses at higher wavelengths. For example, at a wavelength of 1625 nanometers, the fiber has bending losses less than about $10^{-2}$ dB/turn, typically less than about $1.5\times10^{-3}$ dB/turn, for a radius of curvature of 15 millimeters, bending losses less than or equal to about 0.1 dB/turn, typically less than or equal to about $25\times10^{-3}$ dB/turn, for a radius of curvature of 10 millimeters, bending losses less than or equal to about 0.15 dB/turn, typically less than or equal to about 0.08 dB/turn, for a radius of curvature of 7.5 millimeters, and bending losses less than or equal to about 0.25 dB/turn for a radius of curvature of 5 millimeters.

Accordingly, in an exemplary embodiment, the fiber has a cut-off wavelength between about 1240 nanometers and 1310 nanometers, with the cut-off wavelength measured as the wavelength at which the optical signal is no longer multimode mode after propagation over five meters of fiber. Cut-off wavelength is distinguished from cable cut-off, measured as the wavelength at which the attenuation of the LP11 mode is greater than or equal to 19.3 dB after propagation over 22 meters of fiber. The fiber has a cable cut-off wavelength less than or equal to about 1260 nanometers.

Another cut-off definition at issue here is the theoretical cut-off wavelength defined as the wavelength from which the LP11 mode is propagated in leaky mode. In one embodiment, the fiber has a theoretical cut-off wavelength less than or equal to about 1250 nanometers. The fiber has an attenuation of the LP11 mode substantially greater than 5 dB (e.g., 20-90 dB or so) after propagation over 22 meters of fiber at a wavelength of 1260 nanometers.

The operational parameters described previously result from exemplary physical properties of the fiber. In one embodiment, the central core of the fiber has a radius between about 3.8 microns and 4.35 microns; the intermediate cladding has a radius between about 8.5 microns and 9.7 microns; and the depressed trench has a radius between about 13.5 microns and 16 microns, which can be less than or equal to 15 microns (e.g., between about 13.5 and 15 microns). The central core typically has a refractive index difference ($\Delta n_1$) with the external optical cladding between about $4.9\times10^{-3}$ and $5.7\times10^{-3}$.

As noted, the refractive index profile of a fiber is plotted in terms of the difference between refractive index values at points on the radius of the fiber and the external optical cladding. The intermediate cladding has a refractive index difference with the optical cladding between about $-0.1\times10^{-3}$ and $0.6\times10^{-3}$. The depressed trench has a refractive index difference with the optical cladding between about $-10.0\times10^{-3}$ and $-5.0\times10^{-3}$. The fiber has a zero chromatic dispersion wavelength between about 1300 nanometers and 1324 nanometers; the fiber has a chromatic dispersion slope value at the zero chromatic dispersion wavelength of less than about 0.092 ps/(nm$^2$·km).

The present invention also relates to an optical box receiving at least one portion of optical fiber disclosed herein. In such an optical box, the fiber can be arranged with a radius of curvature less than about 15 millimeters, which can be about 5 millimeters. The present invention also relates to an optical fiber system to the subscriber's home (FTTH) including at least one portion of optical fiber disclosed herein.

The foregoing, as well as other characteristics and advantages of the present invention, and the manner in which the same are accomplished, are further specified within the following detailed description and its accompanying drawings.

DETAILED DESCRIPTION

Figure 1:
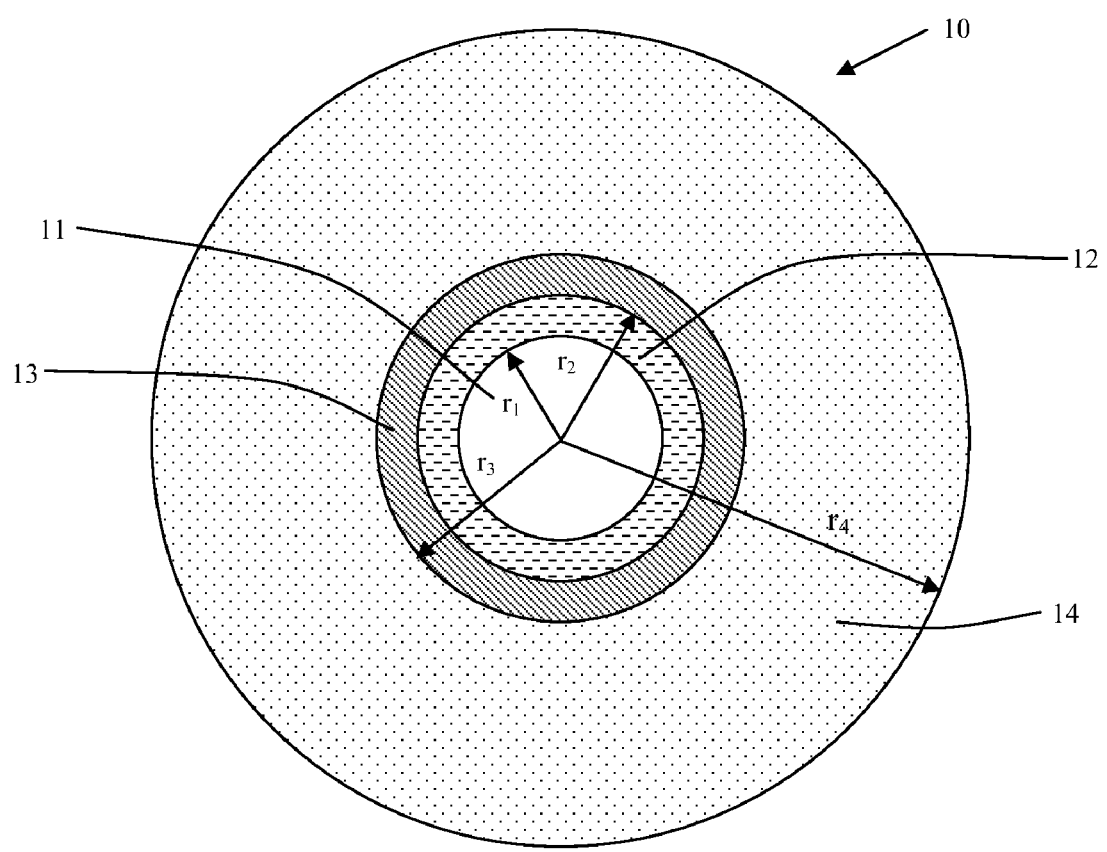
FIG. 1 depicts a cross section of a single-mode fiber with cladding layers at respective radii extending from the center.

As depicted in FIG. 1, the optical fiber (10) of the invention has a central core (11), an intermediate cladding (12), and a depressed cladding (13). For purposes herein and without limiting the scope of the invention, depressed cladding means a radial portion of the fiber (10) having a refractive index less than the refractive index of the external optical cladding (14). Typically, the central core (11), the intermediate cladding (12), and the depressed cladding (13) are obtained by chemical vapor deposition in a silica tube. The external optical cladding (14) includes the silica tube and the overcladding on the tube. In exemplary embodiments, the overcladding is generally natural or doped silica, but can also be obtained by any other deposition technique (e.g., vapor axial deposition ("VAD") or outside vapor deposition ("OVD")).

Figure 2:
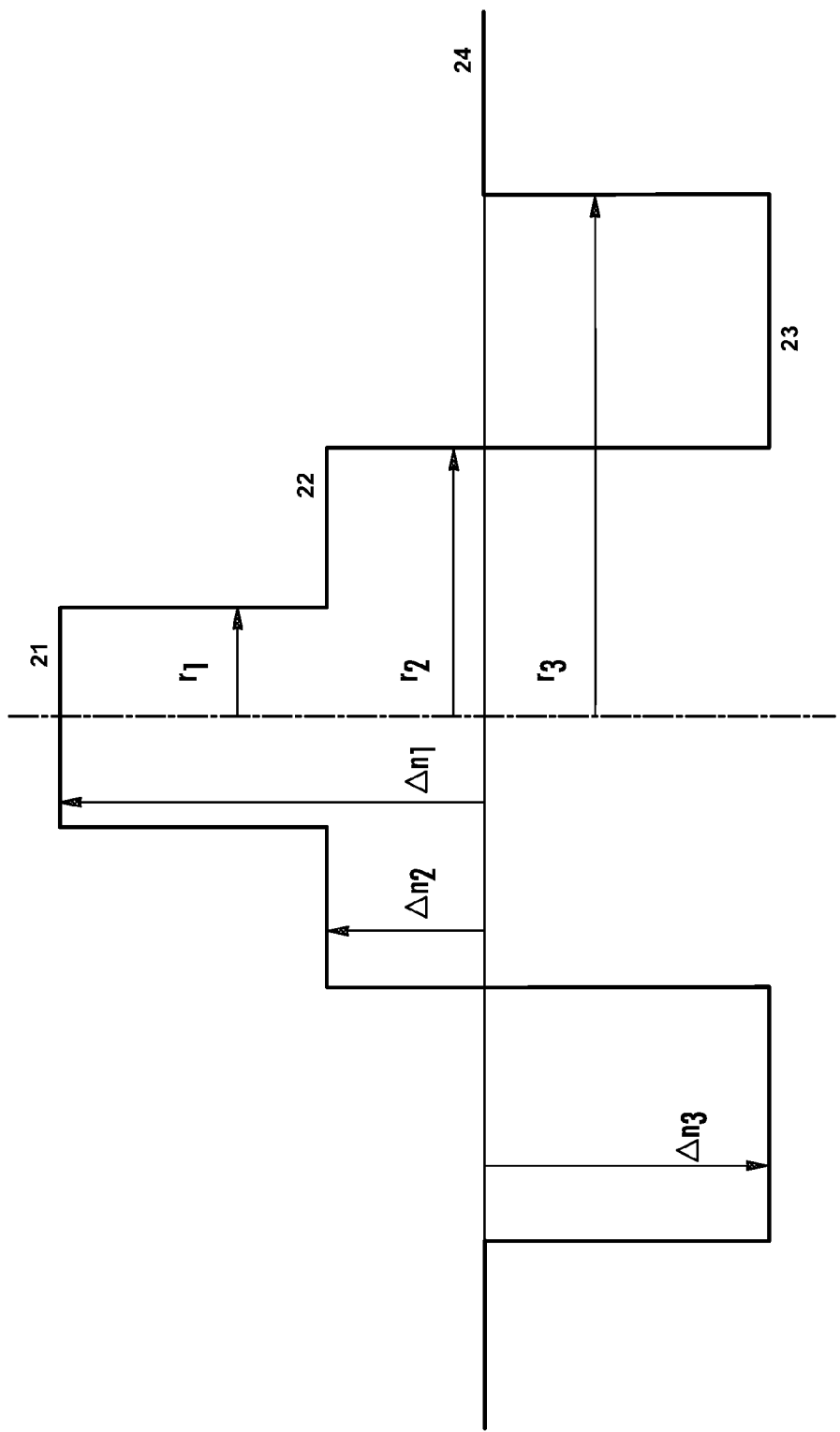
FIG. 2 depicts the nominal refractive index profile of the exemplary single-mode fiber of FIG. 1 in accordance with the present invention.

FIG. 2 illustrates a refractive index profile for the optical fiber (10) of FIG. 1. The profile of FIG. 2 is a set profile (i.e., representative of the theoretical profile of the fiber), but the optical fiber actually obtained after fiber drawing of a preform may have a slightly different profile.

In a manner known in the art, an optical fiber (10) is obtained by preform drawing. By way of example, the preform may be a very high-quality glass tube (e.g., pure silica), which eventually forms part of the external optical cladding (14). The external optical cladding (14) surrounds the central core (11) and the internal claddings (12, 13) of the fiber (10). This tube can then be overcladded to increase its diameter before going through the fiber-drawing operation on a fiber-drawing tower. For the production of the preform, the tube is generally mounted horizontally and held at both ends by glass bars on a lathe. Then, the tube is rotated and heated locally for the deposition process that determines the composition of the preform, which, in turn, determines the optical characteristics of the drawn fiber.

The fiber includes a central core (11) having a refractive index difference $\Delta n_1$ with the external cladding (14), which functions as an optical cladding. The fiber (10) further includes an intermediate cladding (12) having a refractive index difference $\Delta n_2$ with the external optical cladding (14) and a depressed trench cladding (13) having a refractive index difference $\Delta n_3$ with the external optical cladding (14). The refractive indexes in the central core (11), the intermediate cladding (12), and the depressed trench (13) are substantially constant throughout their respective widths, as depicted in FIG. 2. FIG. 1 illustrates that the width of the core (11) is defined by its radius $r_1$ and the width of the claddings by their respective external radii, $r_2$ and $r_3$. The external optical cladding is denoted as $r_4$.

In order to define a set refractive index profile for an optical fiber, the refractive index value of the external optical cladding (14) is generally taken as a reference ($n_g$). The refractive index values of the central core (11), the intermediate cladding (12), and the depressed trench cladding (13) are then presented in FIG. 2 as index differences $\Delta n_{1,2,3}$, respectively. Generally, the external optical cladding (14) is composed of silica, but this cladding can be doped to increase or reduce its refractive index (e.g., to modify the propagation characteristics of the signal).

Each fiber profile section shown in FIG. 2 (21-24) can also be defined based on integrals that link the index variations with the radius of each section of the fiber (10). It is thus possible to define three surface integrals for the fiber (10) of the invention, representative of the surface of the core $V_{01}$, the surface of the intermediate cladding $V_{02}$, and the surface of the depressed trench $V_{03}$. The expression "surface" should not be understood geometrically but rather as corresponding to a value taking two dimensions into account. These three surface integrals can be expressed as follows:

$$V_{01} = \int_0^{r1} \Delta n(r) \cdot dr \approx r_1 \times \Delta n_1$$

$$V_{02} = \int_{r1}^{r2} \Delta n(r) \cdot dr \approx (r_2 - r_1) \times \Delta n_2$$

$$V_{03} = \int_{r2}^{r3} \Delta n(r) \cdot dr \approx (r_3 - r_2) \times \Delta n_3.$$

Similarly, it is possible to define three volume integrals for the optical fiber (10) of the invention, representative of the volume of the core $V_{11}$, the volume of the intermediate cladding $V_{12}$, and the volume of the depressed trench $V_{13}$. The expression "volume" should not be understood geometrically but rather as corresponding to a value taking three dimensions into account. These three volume integrals can be expressed as follows:

$$V_{11} = 2 \cdot \int_0^{r1} \Delta n(r) \cdot r \cdot dr \approx r_1^2 \times \Delta n_1$$

$$V_{12} = 2 \cdot \int_{r1}^{r2} \Delta n(r) \cdot r \cdot dr \approx (r_2^2 - r_1^2) \times \Delta n_2$$

$$V_{13} = 2 \cdot \int_{r2}^{r3} \Delta n(r) \cdot r \cdot dr \approx (r_3^2 - r_2^2) \times \Delta n_3.$$

Unless otherwise noted, the examples presented in the following Tables I-IV are predictive simulations. In this regard, Table I (below) shows nine prophetic examples of fiber profiles according to exemplary embodiments of the invention in comparison with three SSMF fiber profiles and one fiber profile corresponding to the G.657A and G.657B recommendations (noted as "BIF" for Bend Insensitive Fiber), as well as 13 prophetic comparative examples. Draka Comteq markets bend-insensitive optical fibers having good resistance to bending losses under the trade name Bend-Bright®. The values in the tables correspond to the set profiles for each fiber.

All profiles were also designed to ensure a Multi-Path Interference (MPI) level lower than −30 dB, which ensures full compatibility with any properly installed system networks, including Access Network and Fiber-to-the-Home. MPI is defined in "Measurement and System Impact of Multipath Interference From Dispersion Compensating Fiber Modules", W. Zheng et al., IEEE Transactions on Instrumentation and Measurement (2004, 53, pp. 15-23) and its particular measurement considerations detailed in "Measurement of Multipath Interference in the Coherent Crosstalk Regime", S. Ramachandran et al., IEEE Photonics Technology Letters (2003, 15, pp. 1171-1173). The first column of Table I assigns a reference to each example (i.e., "Ex" for prophetic examples according to the invention and "C.Ex" for prophetic comparative examples). The next three columns give the values of the radii of the core (11), the intermediate cladding (12), and the depressed trench (13), respectively. The next three columns give the corresponding values of the refractive index differences with the external optical cladding (14). The refractive index values are measured at a wavelength of 633 nanometers. Table I also shows the surface integral and volume integral values of the core (11), the intermediate cladding (12), and the depressed trench (13) as defined previously.

TABLE I

| | $r_1$ (μm) | $r_2$ (μm) | $r_3$ (μm) | $\Delta n_1$ $[10^{-3}]$ | $\Delta n_2$ $[10^{-3}]$ | $\Delta n_3$ $[10^{-3}]$ | $V_{01}$ (μm) $[10^{-3}]$ | $V_{02}$ (μm) $[10^{-3}]$ | $V_{03}$ (μm) $[10^{-3}]$ | $V_{11}$ (μm²) $[10^{-3}]$ | $V_{12}$ (μm²) $[10^{-3}]$ | $V_{13}$ (μm²) $[10^{-3}]$ |
|---|---|---|---|---|---|---|---|---|---|---|---|---|
| BIF | 3.93 | 9.38 | 14.72 | 5.26 | 0.13 | −5.01 | 20.7 | 0.7 | −26.8 | 81.1 | 9.4 | −645 |
| SSMF1 | 4.35 | 13.92 | | 5.00 | −0.20 | | 21.8 | −1.9 | 0.0 | 94.6 | −35.0 | 0 |
| SSMF2 | 4.51 | 13.92 | | 5.00 | −0.20 | | 22.5 | −1.9 | 0.0 | 101.5 | −34.7 | 0 |
| SSMF3 | 4.55 | 13.92 | | 5.24 | −0.20 | | 23.8 | −1.9 | 0.0 | 108.4 | −34.6 | 0 |
| C. Ex1 | 3.82 | 9.01 | 13.55 | 5.67 | 0.57 | −9.63 | 21.7 | 2.9 | −43.7 | 82.8 | 37.7 | −986 |
| C. Ex2 | 3.96 | 8.61 | 13.86 | 5.58 | 0.31 | −7.87 | 22.1 | 1.4 | −41.3 | 87.6 | 17.9 | −928 |
| C. Ex3 | 3.92 | 8.78 | 13.84 | 5.55 | 0.32 | −8.75 | 21.7 | 1.5 | −44.3 | 85.2 | 19.7 | −1002 |
| C. Ex4 | 3.88 | 9.09 | 14.35 | 5.62 | 0.34 | −7.84 | 21.8 | 1.8 | −41.2 | 84.5 | 23.1 | −965 |
| C. Ex5 | 3.93 | 9.30 | 14.48 | 5.30 | 0.51 | −7.76 | 20.8 | 2.7 | −40.1 | 81.7 | 36.0 | −955 |
| C. Ex6 | 3.93 | 9.28 | 14.47 | 5.31 | 0.53 | −7.51 | 20.9 | 2.8 | −39.0 | 82.0 | 37.5 | −926 |
| C. Ex7 | 3.93 | 8.50 | 15.00 | 5.48 | 0.50 | −5.00 | 21.5 | 2.3 | −32.5 | 84.6 | 28.4 | −764 |
| C. Ex8 | 3.93 | 9.25 | 13.65 | 5.37 | 0.50 | −9.90 | 21.1 | 2.7 | −43.5 | 83.0 | 35.1 | −997 |
| C. Ex9 | 3.93 | 8.50 | 15.50 | 5.33 | 0.51 | −5.00 | 21.0 | 2.3 | −35.0 | 82.4 | 28.8 | −840 |
| C. Ex10 | 3.93 | 9.27 | 13.65 | 5.31 | 0.52 | −9.80 | 20.9 | 2.8 | −42.9 | 82.1 | 36.9 | −983 |
| C. Ex11 | 3.94 | 9.25 | 13.54 | 5.30 | 0.56 | −9.87 | 20.9 | 3.0 | −42.3 | 82.3 | 39.2 | −964 |
| C. Ex12 | 3.95 | 9.29 | 13.91 | 5.30 | 0.50 | −8.93 | 20.9 | 2.7 | −41.2 | 82.6 | 35.4 | −957 |
| C. Ex13 | 3.93 | 8.50 | 15.50 | 5.32 | 0.57 | −5.00 | 20.9 | 2.6 | −35.0 | 82.1 | 32.2 | −840 |
| Ex1 | 3.90 | 9.23 | 14.34 | 4.94 | 0.35 | −7.15 | 19.3 | 1.9 | −36.5 | 75.1 | 24.5 | −861 |
| Ex2 | 3.91 | 9.23 | 14.34 | 5.14 | 0.10 | −7.15 | 20.1 | 0.5 | −36.5 | 78.6 | 7.0 | −861 |
| Ex3 | 3.91 | 9.23 | 14.81 | 5.14 | 0.10 | −7.15 | 20.1 | 0.5 | −39.9 | 78.6 | 7.0 | −959 |

TABLE I-continued

|  | $r_1$ (µm) | $r_2$ (µm) | $r_3$ (µm) | $\Delta n_1$ [$10^{-3}$] | $\Delta n_2$ [$10^{-3}$] | $\Delta n_3$ [$10^{-3}$] | $V_{01}$ (µm) [$10^{-3}$] | $V_{02}$ (µm) [$10^{-3}$] | $V_{03}$ (µm) [$10^{-3}$] | $V_{11}$ (µm$^2$) [$10^{-3}$] | $V_{12}$ (µm$^2$) [$10^{-3}$] | $V_{13}$ (µm$^2$) [$10^{-3}$] |
|---|---|---|---|---|---|---|---|---|---|---|---|---|
| Ex4 | 3.91 | 9.23 | 14.34 | 5.29 | −0.06 | −7.15 | 20.7 | −0.3 | −36.5 | 80.9 | −4.2 | −861 |
| Ex5 | 3.91 | 9.23 | 14.81 | 5.29 | −0.06 | −7.15 | 20.7 | −0.3 | −39.9 | 80.9 | −4.2 | −959 |
| Ex6 | 3.93 | 9.26 | 13.53 | 5.34 | 0.51 | −9.74 | 21.0 | 2.7 | −41.6 | 82.3 | 36.0 | −949 |
| Ex7 | 3.93 | 9.25 | 13.53 | 5.31 | 0.50 | −9.93 | 20.8 | 2.7 | −42.5 | 81.9 | 35.3 | −967 |
| Ex8 | 3.94 | 8.50 | 15.00 | 5.43 | 0.50 | −5.00 | 21.4 | 2.3 | −32.5 | 84.3 | 28.6 | −764 |
| Ex9 | 3.94 | 9.26 | 13.50 | 5.33 | 0.51 | −9.88 | 21.0 | 2.7 | −41.9 | 82.8 | 35.5 | −954 |

The fiber (10) according to the embodiment depicted in FIGS. 1 and 2 is a step-index fiber comprising a central core (11), an intermediate cladding (12), and a depressed trench (13). It is noted from Table I that the central core (11) has a radius $r_1$ between 3.8 microns and 4.35 microns, typically between 3.8 microns and 4.05 microns (i.e., narrower than the core of an SSMF fiber). The fiber (10) has a refractive index difference $\Delta n_1$ (21) with the external optical cladding (14) between $4.9 \times 10^{-3}$ and $5.7 \times 10^{-3}$ (i.e., on the order of or greater than an SSMF fiber). The surface integral of the core $V_{01}$ is between $19.0 \times 10^{-3}$ micron and $23.0 \times 10^{-3}$ micron, and the volume integral of the core $V_{11}$ is between $75 \times 10^{-3}$ µm$^2$ and $91 \times 10^{-3}$ µm$^2$.

It is also noted from Table I that the fiber according to the invention has a depressed trench (13). The depressed trench (13) has a large volume and makes it possible to greatly limit bending losses. Table I thus shows that the depressed trench (13) has a radius $r_3$ between 13.5 microns and 16 microns and a refractive index difference $\Delta n_3$ (23) with the external optical cladding (14) between $-10.0 \times 10^{-3}$ and $-5.0 \times 10^{-3}$. Table I also shows that the surface integral of the depressed trench $V_{03}$, as defined previously, is between $-55.0 \times 10^{-3}$ micron and $-30.0 \times 10^{-3}$ micron, and the volume integral of the depressed trench $V_{13}$, as defined previously, is between $-1200 \times 10^{-3}$ µm$^2$ and $-750 \times 10^{-3}$ µm$^2$.

According to an exemplary embodiment, the radius of the depressed cladding $r_3$ can be limited to 15 microns to further reduce the cost of fiber production. (Note that all the inventive examples have a depressed cladding with a radius of 15 microns or less.) In fact, the depressed trench (13) can be produced by plasma chemical vapor deposition (PCVD), making it possible to incorporate a large quantity of fluorine in the silica to form deeply depressed claddings. The part of the fiber (10) corresponding to the tube and to the PCVD deposition is, however, the most expensive, so it is therefore sought to limit this part as much as possible. It is also possible to envisage producing the depressed trench (13) by incorporation of micro-holes or micro-bubbles rather than by fluorine doping. Fluorine doping, however, remains easier to control for industrial production than the incorporation of micro-bubbles.

A depressed trench (13) corresponding to the surface and volume criteria defined previously makes it possible to achieve a good compromise between greatly reduced bending losses relative to the existing fibers and a sufficiently consistent leakage regime of the LP11 mode at a wavelength of 1260 nanometers.

It is also noted from Table I that an exemplary embodiment of the fiber has an intermediate cladding (12) between the central core (11) and the depressed trench (13). This intermediate cladding (12) makes it possible to limit the effects of the depressed trench (13) on the propagation of the optical signal in the core. Table I shows that the intermediate cladding (12) has a radius $r_2$ between 8.5 microns and 9.7 microns and a refractive index difference $\Delta n_2$ (22) with the optical cladding between $-0.1 \times 10^{-3}$ and $0.6 \times 10^{-3}$. Table I shows that the surface integral of the intermediate cladding $V_{02}$, as defined previously, is between $-0.5 \times 10^{-3}$ micron and $3.0 \times 10^{-3}$ micron. The volume integral of the intermediate cladding $V_{12}$, as defined previously, is between $-6 \times 10^{-3}$ µm$^2$ and $40 \times 10^{-3}$ µm$^2$.

The central core (11) of a fiber (10) according to the invention is designed, in combination with the intermediate cladding (12), to guarantee parameters of optical transmission in the fiber in conformity with the G.652 and G.657A recommendations, particularly in terms of mode field diameter and chromatic dispersion. This also helps ensure compatibility with fibers of other optical systems.

Table II (below) shows the optical transmission characteristics for fibers according to the invention. The first column repeats the references of Table I. The following columns provide, for each fiber profile, the mode field diameter (MFD) values for wavelengths of 1310 nanometers and 1550 nanometers, zero dispersion wavelength (ZDW), and zero dispersion slope (ZDS).

TABLE II

|  | MFD1310 (µm) | MFD1550 (µm) | ZDW (nm) | ZDS ps/(nm$^2$ · km) |
|---|---|---|---|---|
| BIF | 8.80 | 9.90 | 1320 | 0.0878 |
| SSMF1 | 9.14 | 10.31 | 1314 | 0.0855 |
| SSMF2 | 9.27 | 10.39 | 1309 | 0.0871 |
| SSMF3 | 9.18 | 10.25 | 1306 | 0.088 |
| C. Ex1 | 8.67 | 9.68 | 1317 | 0.0908 |
| C. Ex2 | 8.65 | 9.59 | 1310 | 0.0917 |
| C. Ex3 | 8.66 | 9.62 | 1312 | 0.0914 |
| C. Ex4 | 8.64 | 9.65 | 1317 | 0.0897 |
| C. Ex5 | 8.95 | 10.01 | 1317 | 0.0905 |
| C. Ex6 | 8.96 | 10.02 | 1317 | 0.0905 |
| C. Ex7 | 8.80 | 9.81 | 1314 | 0.0906 |
| C. Ex8 | 8.89 | 9.91 | 1315 | 0.0913 |
| C. Ex9 | 8.88 | 9.91 | 1314 | 0.0909 |
| C. Ex10 | 8.94 | 9.97 | 1315 | 0.0914 |
| C. Ex11 | 8.97 | 10.00 | 1314 | 0.0917 |
| C. Ex12 | 8.95 | 9.99 | 1315 | 0.0911 |
| C. Ex13 | 8.92 | 9.95 | 1314 | 0.0911 |
| Ex1 | 9.00 | 10.10 | 1318 | 0.0906 |
| Ex2 | 8.75 | 9.81 | 1318 | 0.0895 |
| Ex3 | 8.75 | 9.81 | 1318 | 0.0895 |
| Ex4 | 8.60 | 9.64 | 1318 | 0.0888 |
| Ex5 | 8.60 | 9.64 | 1318 | 0.0888 |
| Ex6 | 8.91 | 9.94 | 1315 | 0.0913 |
| Ex7 | 8.92 | 9.95 | 1315 | 0.0914 |
| Ex8 | 8.83 | 9.84 | 1313 | 0.0908 |
| Ex9 | 8.93 | 9.95 | 1314 | 0.0915 |

It is noted from Table II that the fiber (10) according to the invention is compatible with fibers corresponding to the criteria of the G.652 recommendation. In particular, the fiber disclosed herein has a mode field diameter MFD in the standardized range of values from 8.6 microns to 9.5 microns at 1310 nanometers, a zero dispersion wavelength between 1300 nanometers and 1324 nanometers, and a zero dispersion slope of less than 0.092 ps/(nm$^2$·km). Each of these values is in accordance with the recommendation G.652.

On the other hand, as shown by Table III (below), the fiber has an effective cut-off wavelength $\lambda_{ceff}$ (or standard fiber cut-off, third column of Table III) greater than 1300 nanometers, or even greater than 1350 nanometers. As discussed, the effective cut-off wavelength is measured as being the wavelength at which the optical signal is no longer single mode after propagation over two meters of fiber, as defined by Subcommittee 86A of the International Electrotechnical Commission in the IEC 60793-1-44 standard.

This increased effective cut-off wavelength value leads to a cable cut-off wavelength value $\lambda_{cc}$ (or standard cable cut-off fifth column of Table III) between 1200 nanometers and 1260 nanometers. The cable cut off wavelength is measured as the wavelength at which the optical signal is no longer single mode after propagation over 22 meters of fiber, as defined by Subcommittee 86A of the International Electrotechnical Commission in the IEC 60793-1-44 standard. The optical signal is single mode when the attenuation of the LP11 mode is greater than or equal to 19.3 dB. The G.652 and G.657 recommendations both impose a maximum value of 1260 nanometers for the cable cut-off wavelength.

One purpose of the developments disclosed herein is to produce fibers that can be used on all of the transmission bandwidths exploited by optical systems (i.e., fibers that can be used in single mode propagation from the original bandwidth (OB), which extends from 1260 nanometers to 1360 nanometers and as far as the ultra-long (UL) bandwidth beyond 1625 nanometers). A low effective cut-off wavelength makes it possible to guarantee the possibility of using the fiber across all of the available bandwidths.

The simulations of Table III (below), however, show that the directly higher order LP11 mode is propagated according to a leaky mode from a wavelength of 1260 nanometers. The fiber disclosed herein can, therefore, be used in single-mode transmission over the original bandwidth (OB: 1260 nanometers to 1360 nanometers).

Table III (below) shows several cut-off wavelength values for optical fibers according to the invention. The first column of Table III repeats the references of Table I.

The column "Theoretical Fiber Cutoff" provides a theoretical cut-off wavelength value, which corresponds to the transition wavelength between a guided propagation of the LP11 mode and a propagation in leaky mode of this LP11 mode. For working wavelengths beyond this effective cut-off wavelength, the LP11 mode is propagated in leaky mode.

The column "Standard Fiber Cutoff" corresponds to the effective cut-off wavelength $\lambda_{ceff}$ as defined by Subcommittee 86A of the International Electrotechnical Commission in the IEC 60793-1-44 standard.

The column "5-m Fiber Cutoff" corresponds to the cut-off wavelength measured as the wavelength over which the optical signal is no longer multi mode after propagation over five meters of fiber. This value therefore corresponds to the effective cut-off wavelength measured after propagation over five meters of fiber instead of two meters of fiber.

The column "Standard Cable Cutoff" corresponds to the cable cut-off wavelength $\lambda_{cc}$ as defined by Subcommittee 86A of the International Electrotechnical Commission in the IEC 60793-1-44 standard. According to the recommendation of Subcommittee 86A of the International Electrotechnical Commission in the IEC 60793-1-44 standard, the cable cut-off wavelength $\lambda_{cc}$ is determined by positioning the fiber into two 40-millimeter radius loops and by arranging the remainder of the fiber (i.e., 21.5 meters of fiber) on a mandrel with a radius of 140 millimeters. This cut-off should be 1260 nanometers or less according to the present invention. Comparative Example 7 complies with this requirement but is slightly too high regarding straight cable cut-off, and hence falls outside the scope of the invention.

The column "Straight Cable Cutoff" corresponds to the cable cut-off wavelength by positioning the fiber into two loops, each having a 40-millimeter radius, and by arranging the remainder of the fiber (i.e., 21.5 meters of fiber) virtually straight. This cut-off should be 1260 nanometers or less according to the present invention. Comparative Examples 9, 10, and 12 comply with this requirement but are slightly too high regarding standard cable cut-off and hence fall outside the scope of the invention.

All comparative examples fall outside the scope of the present invention because each presents a standard cut-off that is higher than 1260 nanometers and/or a straight cable cut-off that is higher than 1260 nanometers.

The column "LP11 LL @1260 after 22 m" indicates the leakage losses of the LP11 mode after propagation over 22 meters of virtually straight fiber.

The column "Length-19.3 dB LP11 LL @1260 nm" indicates the length of fiber required to achieve leakage losses of the LP11 mode equal to 19.3 dB with the fiber being kept virtually straight. This indicates at which distance the fiber, arranged virtually straight, is single mode within the meaning of the G.652 and G.657 recommendations.

TABLE III

| | Fiber Cutoff (theory) (nm) | Std Fiber Cutoff (nm) | 5-m Fiber Cutoff (nm) | Std Cable Cutoff (nm) | Straight Cable Cutoff (nm) | LP11 LL @1260 nm after 22 m (dB) | Length-19.3 dB LP11 LL @1260 nm (m) |
|---|---|---|---|---|---|---|---|
| BIF | 1197 | 1270 | 1234 | 1196 | 1208 | 180 | 2 |
| SSMF1 | 1287 | 1226 | 1226 | 1151 | 1151 | 2 | 212 |
| SSMF2 | 1334 | 1267 | 1267 | 1188 | 1188 | 0 | >1000 |
| SSMF3 | 1381 | 1311 | 1311 | 1231 | 1231 | 0 | >1000 |
| C. Ex1 | 1250 | 1379 | 1321 | 1271 | 1268 | 10 | 41 |
| C. Ex2 | 1243 | 1383 | 1323 | 1271 | 1266 | 16 | 27 |
| C. Ex3 | 1232 | 1397 | 1333 | 1271 | 1265 | 16 | 26 |
| C. Ex4 | 1239 | 1392 | 1331 | 1272 | 1267 | 15 | 28 |
| C. Ex5 | 1242 | 1382 | 1322 | 1268 | 1264 | 18 | 24 |
| C. Ex6 | 1247 | 1376 | 1319 | 1267 | 1266 | 15 | 28 |
| C. Ex7 | 1249 | 1351 | 1302 | 1259 | 1262 | 18 | 23 |

TABLE III-continued

|   | Fiber Cutoff (theory) (nm) | Std Fiber Cutoff (nm) | 5-m Fiber Cutoff (nm) | Std Cable Cutoff (nm) | Straight Cable Cutoff (nm) | LP11 LL @1260 nm after 22 m (dB) | Length- 19.3 dB LP11 LL @1260 nm (m) |
|---|---|---|---|---|---|---|---|
| C. Ex8  | 1246 | 1378 | 1319 | 1268 | 1264 | 17 | 25 |
| C. Ex9  | 1235 | 1373 | 1317 | 1264 | 1260 | 18 | 24 |
| C. Ex10 | 1243 | 1371 | 1313 | 1263 | 1260 | 22 | 20 |
| C. Ex11 | 1248 | 1367 | 1310 | 1263 | 1263 | 17 | 25 |
| C. Ex12 | 1244 | 1371 | 1314 | 1264 | 1260 | 20 | 21 |
| C. Ex13 | 1240 | 1375 | 1319 | 1267 | 1263 | 17 | 24 |
| Ex1 | 1175 | 1316 | 1255 | 1204 | 1201 | 88 | 5 |
| Ex2 | 1171 | 1316 | 1246 | 1205 | 1198 | 83 | 5 |
| Ex3 | 1171 | 1366 | 1271 | 1225 | 1205 | 44 | 10 |
| Ex4 | 1171 | 1316 | 1244 | 1207 | 1195 | 75 | 6 |
| Ex5 | 1171 | 1366 | 1269 | 1226 | 1200 | 40 | 11 |
| Ex9 | 1243 | 1360 | 1304 | 1257 | 1258 | 26 | 16 |
| Ex7 | 1238 | 1362 | 1305 | 1256 | 1255 | 24 | 17 |
| Ex8 | 1247 | 1350 | 1300 | 1257 | 1260 | 22 | 19 |
| Ex9 | 1245 | 1362 | 1306 | 1259 | 1259 | 24 | 18 |

It is noted from Table III that the standard effective cut-off wavelength $\lambda_{ceff}$ (i.e., as measured according to the recommendations of Subcommittee 86A of the International Electrotechnical Commission in the IEC 60793-1-44 standard) is greater than 1300 nanometers. Similarly, it is noted from Table III that the standard cable cut-off wavelength $\lambda_{cc}$ (i.e., as measured according to the recommendations of Subcommittee 86A of the International Electrotechnical Commission in the IEC 60793-44 standard) is between 1200 nanometers and 1260 nanometers (i.e., complying with the limit of 1260 nanometers imposed by the G.652 and G.657 recommendations).

It is noted from Table III that the LP11 mode is highly attenuated from a wavelength of 1260 nanometers. In fact, the "theoretical" fiber cut-off wavelength is less than or equal to 1250 nanometers. Thus, the higher order LP11 mode is propagated in a leaky mode regime in the original bandwidth, and only the fundamental mode remains guided in the fiber of the invention from a wavelength of 1260 nanometers.

Similarly, it is noted from Table III that the fiber cut-off wavelength is significantly reduced after only five meters of propagation in the fiber. Thus, the cut-off wavelength, measured as the wavelength at which the optical signal is no longer single mode after propagation over five meters of fiber, is between 1240 nanometers and 1310 nanometers for a fiber according to the invention.

Moreover, Table III clearly shows that the LP11 mode is already well attenuated after 22 meters of propagation. It is noted in particular that the attenuation of the LP11 mode in a fiber (10) according to the invention is greater than the attenuation of the LP11 mode in an SSMF fiber when the fiber is arranged virtually straight. In fact, in an SSMF fiber, it is the bends that make it possible to highly attenuate the LP11 mode. Thus, the fiber has an attenuation of the LP11 mode greater than 5 dB (e.g., typically more than 20 dB) after 22 meters of propagation in straight fiber at a wavelength of 1260 nanometers.

Furthermore, Table III also shows that the attenuation of at least 19.3 dB of the LP11 mode is achieved relatively rapidly, after less than 22 meters, in accordance with cable cut-off imposed by the recommendation.

Moreover, the increase in the effective cut-off wavelength makes it possible to increase the value of the MAC as defined previously and, consequently, to reduce the bending losses.

Table IV (below) reports bending loss values for exemplary embodiments of fibers as disclosed herein. The first column of Table IV repeats the references of Table I. The next four columns show bending loss values PPC for respective radii of curvature of 15 millimeters, 10 millimeters, 7.5 millimeters, and 5 millimeters at a wavelength of 1550 nanometers. The next four columns give bending loss values PPC for respective radii of curvature of 15 millimeters, 10 millimeters, 7.5 millimeters, and 5 millimeters at a wavelength of 1625 nanometers.

The last column has a factor of merit (FOM) representing the order of magnitude of the improvement in the bending losses by the fibers according to the invention relative to the limits imposed by the G.657B recommendation. The FOM of Table IV is thus defined as an average of the ratios between the upper limits imposed by the G.657B standard and the bending losses in the fibers of the invention for each radius of curvature measured. All examples present a FOM lower than or equal to 1, thus meaning each complies with the G.657B bend losses recommendations.

Table IV reports on the first line the bending loss limit values imposed by the G.657B recommendation for each radius of curvature and for the wavelengths of 1550 nanometers and 1625 nanometers.

TABLE IV

|  | R = 15 mm | R = 10 mm | R = 7.5 mm | R = 5 mm | R = 15 mm | R = 10 mm | R = 7.5 mm | R = 5 mm | |
|---|---|---|---|---|---|---|---|---|---|
|  | PPC @1550 nm (dB/turn) | | | | PPC @1625 nm (dB/turn) | | | | FOM |
| G.657B | 3E−03 | 1E−01 | 5E−01 |  | 1E−02 | 2E−01 | 1E+00 |  | 1.00 |
| BIF | 1.3E−03 | 2.9E−02 | 1.0E−01 | 3.3E−01 | 7.0E−03 | 8.4E−02 | 2.3E−01 | 6.3E−01 | 0.70 |
| SSMF1 | 1.5E−02 | 6.0E−01 | 3.4E+00 | 1.7E+01 | 7.5E−02 | 1.7E+00 | 6.9E−00 | 2.7E+01 | 8.44 |
| SSMF2 | 6.3E−03 | 3.6E−01 | 2.4E+00 | 1.4E+01 | 3.4E−02 | 1.0E+00 | 5.0E+00 | 2.3E+01 | 5.21 |

TABLE IV-continued

|  | R = 15 mm | R = 10 mm | R = 7.5 mm | R = 5 mm | R = 15 mm | R = 10 mm | R = 7.5 mm | R = 5 mm |  |
|  | PPC @1550 nm (dB/turn) | | | | PPC @1625 nm (dB/turn) | | | | FOM |
|---|---|---|---|---|---|---|---|---|---|
| SSMF3 | 9.6E−04 | 1.1E−01 | 1.0E+00 | 8.9E+00 | 6.5E−03 | 3.6E−01 | 2.5E+00 | 1.4E+01 | 2.45 |
| C. Ex1 | 4.9E−05 | 2.9E−03 | 1.6E−02 | 7.1E−02 | 3.9E−04 | 1.1E−02 | 4.2E−02 | 1.3E−01 | 0.05 |
| C. Ex2 | 5.4E−05 | 2.9E−03 | 1.6E−02 | 6.5E−02 | 4.3E−04 | 1.1E−02 | 4.1E−02 | 1.3E−01 | 0.05 |
| C. Ex3 | 6.6E−05 | 3.0E−03 | 1.5E−02 | 5.6E−02 | 5.0E−04 | 1.1E−02 | 3.8E−02 | 1.1E−01 | 0.05 |
| C. Ex4 | 6.2E−05 | 3.1E−03 | 1.5E−02 | 6.3E−02 | 4.7E−04 | 1.1E−02 | 3.9E−02 | 1.2E−01 | 0.06 |
| C. Ex5 | 2.2E−04 | 6.9E−03 | 2.7E−02 | 1.0E−01 | 1.3E−03 | 2.1E−02 | 6.4E−02 | 1.8E−01 | 0.13 |
| C. Ex6 | 2.1E−04 | 7.1E−03 | 2.9E−02 | 1.1E−01 | 1.3E−03 | 2.2E−02 | 6.9E−02 | 2.0E−01 | 0.13 |
| C. Ex7 | 1.4E−04 | 6.5E−03 | 3.1E−02 | 1.3E−01 | 1.0E−03 | 2.2E−02 | 7.7E−02 | 2.4E−01 | 0.11 |
| C. Ex8 | 1.4E−04 | 5.4E−03 | 2.4E−02 | 9.0E−02 | 9.2E−04 | 1.8E−02 | 5.8E−02 | 1.7E−01 | 0.09 |
| C. Ex9 | 2.3E−04 | 7.3E−03 | 2.8E−02 | 1.0E−01 | 1.4E−03 | 2.3E−02 | 6.8E−02 | 2.0E−01 | 0.14 |
| C. Ex10 | 2.0E−04 | 6.8E−03 | 2.9E−02 | 1.0E−01 | 1.2E−03 | 2.2E−02 | 6.8E−02 | 2.0E−01 | 0.12 |
| C. Ex11 | 2.0E−04 | 7.1E−03 | 3.0E−02 | 1.1E−01 | 1.2E−03 | 2.3E−02 | 7.1E−02 | 2.1E−01 | 0.12 |
| C. Ex12 | 2.0E−04 | 7.0E−03 | 2.9E−02 | 1.0E−01 | 1.3E−03 | 2.2E−02 | 6.8E−02 | 2.0E−01 | 0.13 |
| C. Ex13 | 2.3E−04 | 7.4E−03 | 2.9E−02 | 1.1E−01 | 1.4E−03 | 2.3E−02 | 7.0E−02 | 2.1E−01 | 0.14 |
| Ex1 | 2.3E−03 | 2.8E−02 | 8.0E−02 | 1.4E−01 | 1.0E−02 | 7.5E−02 | 1.7E−01 | 2.5E−01 | 1.00 |
| Ex2 | 1.2E−03 | 1.9E−02 | 5.0E−02 | 1.0E−01 | 6.5E−03 | 5.4E−02 | 1.3E−01 | 2.1E−01 | 0.65 |
| Ex3 | 8.5E−04 | 1.2E−02 | 3.6E−02 | 6.7E−02 | 4.5E−03 | 3.7E−02 | 8.4E−02 | 1.4E−01 | 0.45 |
| Ex4 | 7.1E−04 | 1.3E−02 | 4.3E−02 | 8.7E−02 | 4.1E−03 | 4.2E−02 | 1.0E−01 | 1.8E−01 | 0.41 |
| Ex5 | 4.9E−04 | 8.7E−03 | 2.8E−02 | 5.6E−02 | 2.8E−03 | 2.8E−02 | 6.7E−02 | 1.2E−01 | 0.28 |
| Ex6 | 2.0E−04 | 7.1E−03 | 3.1E−02 | 1.1E−01 | 1.2E−03 | 2.3E−02 | 7.2E−02 | 2.1E−01 | 0.12 |
| Ex7 | 2.2E−04 | 7.4E−03 | 3.1E−02 | 1.1E−01 | 1.4E−03 | 2.4E−02 | 7.2E−02 | 2.1E−01 | 0.14 |
| Ex8 | 1.7E−04 | 7.4E−03 | 3.4E−02 | 1.3E−01 | 1.2E−03 | 2.4E−02 | 8.2E−02 | 2.5E−01 | 0.12 |
| Ex9 | 1.9E−04 | 7.0E−03 | 3.0E−02 | 1.1E−01 | 1.2E−03 | 2.3E−02 | 7.2E−02 | 2.1E−01 | 0.12 |

It is noted from Table IV that the bending losses of the fibers corresponding to the profile according to the invention are less than or equal to the limits imposed by the G.657B standard. With respect to Example 1, the bending loss at 1625 nanometers at a curvature of 15 millimeters is the same as the recommendation.

Thus, the optical fiber disclosed (above) has, for a wavelength of 1550 nanometers, bending losses less than $3 \times 10^{-3}$ dB/turn, typically less than $0.25 \times 10^{-3}$ dB/turn, for a radius of curvature of 15 millimeters, as compared to a limit of $3 \times 10^{-3}$ dB/turn imposed by the G.657B recommendation. The fiber further has bending losses less than or equal $3 \times 10^{-2}$, typically less than or equal to $7.5 \times 10^{-3}$ dB/turn, for a radius of curvature of 10 millimeters, as compared against a limit of 0.1 dB/turn imposed by the G.657B recommendation. The bending losses are less than or equal to 0.05 dB/turn for a radius of curvature of 7.5 millimeters, as against a limit of 0.5 dB/turn imposed by the G.657B recommendation, and bending losses less than 0.15 dB/turn, typically less than or equal to 0.10 dB/turn, for a radius of curvature of 5 millimeters.

Similarly, the fiber according to the invention exhibits, for a wavelength of 1625 nanometers, bending losses less than $10^{-2}$ dB/turn, typically less than $1.5 \times 10^{-3}$ dB/turn, for a radius of curvature of 15 millimeters, as compared to a limit of $10^{-2}$ dB/turn imposed by the G.657B recommendation. The bending losses are less than or equal to 0.1 dB/turn, typically less than or equal to $25 \times 10^{-3}$ dB/turn, for a radius of curvature of 10 millimeters, as compared to a limit of 0.2 dB/turn imposed by the G.657B recommendation. The fiber exhibits bending losses less than or equal to 0.15 dB/turn, typically less than or equal to 0.08 dB/turn, for a radius of curvature of 7.5 millimeters, as against a limit of 1 dB/turn imposed by the G.657B recommendation, and bending losses less than 0.25 dB/turn for a radius of curvature of 5 millimeters.

The fibers disclosed herein are well suited to a use in optical systems installed in the subscriber's home (e.g., FTTH deployments) in which the fiber is subjected to significant bend stresses due to the miniaturization of the optical box or holding the fiber in place with staples. The present fiber can be placed in particularly compact optical boxes. In fact, the optical fiber may be arranged with a radius of curvature of less than 15 millimeters (e.g., a radius of curvature about 5 millimeters). The fiber remains compatible with the fibers of existing systems, particularly with respect to mode field diameter for good fiber-to-fiber coupling. The increase in the cut-off wavelength is not detrimental due to a significant attenuation of the LP11 mode from a wavelength of 1260 nanometers.

As set forth in commonly assigned U.S. Patent Application No. 60/986,737 for a Microbend-Resistant Optical Fiber (Overton), commonly assigned U.S. Patent Application No. 61/041,484 (Overton) for a Microbend-Resistant Optical Fiber, and commonly assigned U.S. Patent Application No. 61/112,595 (Overton) for a Microbend-Resistant Optical Fiber, pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× as compared with a single-mode fiber employing a conventional coating system). It is further within the scope of the present invention to employ the coatings disclosed in U.S. Patent Application No. 60/986,737, U.S. Patent Application No. 61/041,484, and U.S. Patent Application No. 61/112,595 with the single-mode optical fiber of the present invention.

Accordingly, this application incorporates entirely by reference the following commonly assigned patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application No. PCT/US08/82927 Microbend-Resistant Optical Fiber, filed Nov. 9, 2008, (Overton); and U.S. patent application Ser. No. 12/267,732 for a Microbend-Resistant Optical Fiber, filed Nov. 10, 2008, (Overton).

In this regard, microbending can be analyzed according to the IEC fixed-diameter sandpaper drum test (i.e., IEC TR62221, Method B, 40-micron grade sandpaper), which provides a microbending stress situation that affects single-mode fibers even at room temperature. The IEC TR62221 microbending-sensitivity technical report and standard test procedures (e.g., IEC TR62221, Method B (fixed-diameter sandpaper drum) and Method D (basketweave)) are hereby incorporated by reference in their entirety.

This application further incorporates entirely by reference the following commonly assigned patents, patent application publications, and patent applications, each of which discusses optical fibers: U.S. Pat. No. 4,838,643 for a Single Mode Bend Insensitive Fiber for Use in Fiber Optic Guidance Applications (Hodges et al.); U.S. Patent Application Publication No. US2007/0127878 A1 and its related U.S. patent application Ser. No. 11/556,895 for a Single Mode Optical Fiber (de Montmorillon et al.); U.S. Patent Application Publication No. US2007/0280615 A1 and its related U.S. patent application Ser. No. 11/697,994 for a Single-Mode Optical Fiber (de Montmorillon et al.); U.S. Pat. No. 7,356,234 for Chromatic Dispersion Compensating Fiber (de Montmorillon et al.); U.S. Pat. No. 7,483,613 for Chromatic Dispersion Compensating Fiber (de Montmorillon et al.); U.S. Patent Application Publication No. US2008/0152288 A1 and its related U.S. patent application Ser. No. 11/999,333 for an Optical Fiber (Flammer et al.); U.S. patent application Ser. No. 12/098,804 for Transmission Optical Fiber Having Large Effective Area (Sillard et al.); U.S. patent application Ser. No. 12/418,523 for Dispersion-Shifted Optical Fiber (Sillard et al.); U.S. Patent Application No. 61/101,337 for a Bend-Insensitive Optical Fiber, filed Sep. 30, 2008, (de Montmorillon et al.); U.S. Patent Application No. 61/112,006 for a Bend-Insensitive Single-Mode Optical Fiber, filed Nov. 6, 2008, (de Montmorillon et al.); U.S. Patent Application No. 61/112,374 for a Bend-Insensitive Single-Mode Optical Fiber, filed Nov. 7, 2008, (de Montmorillon et al.); and U.S. patent application Ser. No. 12/436,423 for a Single Mode Optical Fiber Having Reduced Bending Losses, concurrently filed May 6, 2009, (de Montmorillon et al.).

The present fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber may have an outer diameter of about 125 microns. With respect to the optical fiber's surrounding coating layers, the primary coating may have an outer diameter of between about 175 microns and about 195 microns (i.e., a primary coating thickness of between about 25 microns and 35 microns) and the secondary coating may have an outer diameter of between about 235 microns and about 265 microns (i.e., a secondary coating thickness of between about 20 microns and 45 microns). Optionally, the present optical fiber may include an outermost ink layer, which is typically between two and ten microns.

In an alternative embodiment, the present optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. By way of example, in such embodiments the primary coating layer may have an outer diameter of between about 135 microns and about 175 microns (e.g., about 160 microns), and the secondary coating layer may have an outer diameter of between about 150 microns and about 230 microns (e.g., more than about 165 microns, such as 190-210 microns or so). In other words, the total diameter of the optical fiber is reduced to less than about 230 microns (e.g., about 200 microns).

As noted, the present optical fiber may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fiber may be deployed in various structures, such as those exemplary structures disclosed hereinafter.

For example, one or more of the present optical fibers may be enclosed within a buffer tube. For instance, optical fiber may be deployed in either a single fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation) it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S-Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned within a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Patent Application Publication No. US2007/0019915 A1 for a Water-Swellable Tape, Adhesive-Backed for Coupling When Used Inside a Buffer Tube (Overton et al.), each of which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Patent Application Publication No. US2008/0145010 A1 for a Gel-Free Buffer Tube with Adhesively Coupled Optical Element (Overton et al.), which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Patent Application Publication No. US2009/0003785 A1 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Patent Application Publication No. US2007/0263960 for a Communication Cable Assembly and Installation Method (Lock et al.), and U.S. Patent Application Publication No. US2008/0317410 for a Modified Pre-Ferrulized Communication Cable Assembly and Installation Method (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about seventy to eighty percent of the duct's or microducts inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting, or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment, which itself may employ the present optical fiber as previously disclosed. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

The present optical fibers may include Fiber Bragg Grating (FBG). As will be known by those having ordinary skill in the art, FBG is a periodic or aperiodic variation in the refractive index of an optical fiber core and/or cladding. This variation in the refractive index results in a range of wavelengths (e.g., a narrow range) being reflected rather than transmitted, with maximum reflectivity occurring at the Bragg wavelength.

Fiber Bragg Grating is commonly written into an optical fiber by exposing the optical fiber to an intense source of ultraviolet light (e.g., a UV laser). In this respect, UV photons may have enough energy to break molecular bonds within an optical fiber, which alters the structure of the fiber, thereby increasing the fiber's refractive index. Moreover, dopants (e.g., boron or germanium) and/or hydrogen loading can be employed to increase photosensitivity.

In order to expose a coated glass fiber to UV light for the creation of FBG, the coating may be removed. Alternatively, coatings that are transparent at the particular UV wavelengths (e.g., the UV wavelengths emitted by a UV laser to write FBG) may be employed to render coating removal unnecessary. In addition, silicone, polyimide, acrylate, or PFCB coatings, for instance, may be employed for high-temperature applications.

A particular FBG pattern may be created by employing (i) a photomask placed between the UV light source and the optical fiber, (ii) interference between multiple UV light beams, which interfere with each other in accordance with the desired FBG pattern (e.g., a uniform, chirped, or titled pattern), or (iii) a narrow UV light beam for creating individual variations. The FBG structure may have, for example, a uniform positive-only index change, a Gaussian-apodized index change, a raised-cosine-apodized index change, or a discrete phase shift index change. Multiple FBG patterns may be combined on a single optical fiber.

Optical fibers having FBG may be employed in various sensing applications (e.g., for detecting vibration, temperature, pressure, moisture, or movement). In this respect, changes in the optical fiber (e.g., a change in temperature) result in a shift in the Bragg wavelength, which is measured by a sensor. FBG may be used to identify a particular optical fiber (e.g., if the fiber is broken into pieces).

Fiber Bragg Grating may also be used in various active or passive communication components (e.g., wavelength-selective filters, multiplexers, demultiplexers, Mach-Zehnder interferometers, distributed Bragg reflector lasers, pump/laser stabilizers, and supervisory channels).

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for Optical Unit for Fiber Optic Cables; U.S. Pat. No. 6,066,397 for Polypropylene Filler Rods for Optical Fiber Communications Cables; U.S. Pat. No. 6,175,677 for Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for Method for Accessing Optical Fibers in the Midspan Region of an Optical Fiber Cable; U.S. Pat. No. 6,381,390 for Color-Coded Optical Fiber Ribbon and Die for Making the Same; U.S. Pat. No. 6,181,857 for Method for Accessing Optical Fibers Contained in a Sheath; U.S. Pat. No. 6,314,224 for Thick-Walled Cable Jacket with Non-Circular Cavity Cross Section; U.S. Pat. No. 6,334,016 for Optical Fiber Ribbon Matrix Material Having Optimal Handling Characteristics; U.S. Pat. No. 6,321,012 for Optical Fiber Having Water Swellable Material for Identifying Grouping of Fiber Groups; U.S. Pat. No. 6,321,014 for Method for Manufacturing Optical Fiber Ribbon; U.S. Pat. No. 6,210,802 for Polypropylene Filler Rods for Optical Fiber Communications Cables; U.S. Pat. No.

6,493,491 for Optical Drop Cable for Aerial Installation; U.S. Pat. No. 7,346,244 for Coated Central Strength Member for Fiber Optic Cables with Reduced Shrinkage; U.S. Pat. No. 6,658,184 for Protective Skin for Optical Fibers; U.S. Pat. No. 6,603,908 for Buffer Tube that Results in Easy Access to and Low Attenuation of Fibers Disposed Within Buffer Tube; U.S. Pat. No. 7,045,010 for Applicator for High-Speed Gel Buffering of Flextube Optical Fiber Bundles; U.S. Pat. No. 6,749,446 for Optical Fiber Cable with Cushion Members Protecting Optical Fiber Ribbon Stack; U.S. Pat. No. 6,922,515 for Method and Apparatus to Reduce Variation of Excess Fiber Length in Buffer Tubes of Fiber Optic Cables; U.S. Pat. No. 6,618,538 for Method and Apparatus to Reduce Variation of Excess Fiber Length in Buffer Tubes of Fiber Optic Cables; U.S. Pat. No. 7,322,122 for Method and Apparatus for Curing a Fiber Having at Least Two Fiber Coating Curing Stages; U.S. Pat. No. 6,912,347 for Optimized Fiber Optic Cable Suitable for Microduct Blown Installation; U.S. Pat. No. 6,941,049 for Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); International Patent Application Publication No. 2007/013923 for Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Patent Application Publication No. US2007/0183726 A1 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US2008/0145010 A1 for a Gel-Free Buffer Tube with Adhesively Coupled Optical Element (Overton et al.); U.S. Patent Application Publication No. US2008/0181564 A1 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); and U.S. patent application Ser. No. 12/391,327 for a Buffer Tube with Hollow Channels, filed Feb. 24, 2009, (Lookadoo et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A single-mode optical fiber, comprising:
a central core surrounded by an outer optical cladding, the central core having a radius $r_1$ and a positive refractive index difference $\Delta n_1$ with the outer optical cladding;
an intermediate cladding positioned between the central core and the outer optical cladding, the intermediate cladding having a radius $r_2$ and a refractive index difference $\Delta n_2$ with the outer optical cladding, wherein the refractive index difference $\Delta n_2$ is less than the refractive index difference $\Delta n_1$; and
a depressed trench positioned between the intermediate cladding and the outer optical cladding, the depressed trench having a radius $r_3$ and a negative refractive index difference $\Delta n_3$ with the outer optical cladding;
wherein, at a wavelength of 1310 nanometers, the optical fiber has a nominal mode field diameter (MFD) between 8.6 microns and 9.5 microns;
wherein, at a wavelength of 1550 nanometers, the optical fiber has bending losses less than 0.15 dB/turn for a radius of curvature of 5 millimeters; and
wherein the optical fiber has standard and straight cable cut-off wavelengths of 1260 nanometers or less, measured as the wavelength at which the attenuation of the LP11 mode is greater than or equal to 19.3 dB after propagation over 22 meters of fiber.

2. The optical fiber according to claim 1, wherein:
the surface integral of the central core ($V_{01}$), defined as $$V_{01} = \int_0^{r1} \Delta n(r) \cdot dr \approx r_1 \times \Delta n_1,$$

is between $19.0 \times 10^{-3}$ micron and $23.0 \times 10^{-3}$ micron.

3. The optical fiber according to claim 2, wherein the surface integral of the central core ($V_{01}$) is between $20.0 \times 10^{-3}$ micron and $21.5 \times 10^{-3}$ micron.

4. The optical fiber according to claim 1, wherein:
the surface integral of the depressed trench ($V_{03}$), defined as $$V_{03} = \int_{r2}^{r3} \Delta n(r) \cdot dr \approx (r_3 - r_2) \times \Delta n_3,$$

is between $-55.0 \times 10^{-3}$ micron and $-30.0 \times 10^{-3}$ micron.

5. The optical fiber according to claim 4, wherein the surface integral of the depressed trench ($V_{03}$) is between $-42.5 \times 10^{-3}$ micron and $-32.5 \times 10^{-3}$ micron.

6. The optical fiber according to claim 1, wherein:
the volume integral of the depressed trench ($V_{13}$), defined as $$V_{13} = 2 \cdot \int_{r2}^{r3} \Delta n(r) \cdot r \cdot dr \approx (r_3^2 - r_2^2) \times \Delta n_3,$$

is between $-1200 \times 10^{-3}$ µm² and $-750 \times 10^{-3}$ µm².

7. The optical fiber according to claim 6, wherein the volume integral of the depressed trench ($V_{13}$) is between $-1000 \times 10^{-3}$ µm² and $-750 \times 10^{-3}$ µm².

8. The optical fiber according to claim 1, wherein the optical fiber has an effective cut-off wavelength $\lambda_{ceff}$ greater than 1300 nanometers.

9. The optical fiber according to claim 1, wherein, at a wavelength of 1550 nanometers, the optical fiber has bending losses less than or equal to $3 \times 10^{-3}$ dB/turn for a radius of curvature of 15 millimeters.

10. The optical fiber according to claim 1, wherein, at a wavelength of 1550 nanometers, the optical fiber has bending losses less than or equal to $3 \times 10^{-2}$ dB/turn for a radius of curvature of 10 millimeters.

11. The optical fiber according to claim 1, wherein, at a wavelength of 1550 nanometers, the optical fiber has bending losses less than or equal to 0.05 dB/turn for a radius of curvature of 7.5 millimeters.

12. The optical fiber according to claim 1, wherein, at a wavelength of 1550 nanometers, the optical fiber has bending losses less than 0.10 dB/turn for a radius of curvature of 5 millimeters.

13. The optical fiber according to claim 1, wherein, at a wavelength of 1625 nanometers, the optical fiber has bending losses less than $10^{-2}$ dB/turn for a radius of curvature of 15 millimeters.

14. The optical fiber according to claim 1, wherein, at a wavelength of 1625 nanometers, the optical fiber has bending losses less than or equal to 0.1 dB/turn for a radius of curvature of 10 millimeters.

15. The optical fiber according to claim 1, wherein, at a wavelength of 1625 nanometers, the optical fiber has bending losses less than or equal to 0.15 dB/turn for a radius of curvature of 7.5 millimeters.

16. The optical fiber according to claim 1, wherein, at a wavelength of 1625 nanometers, the optical fiber has bending losses less than or equal to 0.25 dB/turn for a radius of curvature of 5 millimeters.

17. The optical fiber according to claim 1, wherein the optical fiber has a cut-off wavelength between 1240 nanometers and 1310 nanometers.

18. The optical fiber according to claim 1, wherein the optical fiber has a theoretical cut-off wavelength less than or equal to 1250 nanometers.

19. The optical fiber according to claim 1, wherein the central core has a radius ($r_1$) between 3.8 microns and 4.35 microns.

20. The optical fiber according to claim 1, wherein the intermediate cladding has a radius ($r_2$) between 8.5 microns and 9.7 microns.

21. The optical fiber according to claim 1, wherein the depressed trench has a radius ($r_3$) between 13.5 microns and 16 microns.

22. The optical fiber according to claim 21, wherein the depressed trench has a radius ($r_3$) less than or equal to 15 microns.

23. The optical fiber according to claim 1, wherein the central core has a refractive index difference ($\Delta n_1$) with the outer optical cladding between $4.9 \times 10^{-3}$ and $5.7 \times 10^{-3}$.

24. The optical fiber according to claim 1, wherein the intermediate cladding has a refractive index difference ($\Delta n_2$) with the outer optical cladding between $-0.1 \times 10^{-3}$ and $0.6 \times 10^{-3}$.

25. The optical fiber according to claim 1, wherein the depressed trench has a refractive index difference ($\Delta n_3$) with the outer optical cladding between $-10.0 \times 10^{-3}$ and $-5.0 \times 10^{-3}$.

26. The optical fiber according claim 1, wherein the optical fiber has a zero chromatic dispersion wavelength (ZDW) between 1300 nanometers and 1324 nanometers.

27. The optical fiber according to claim 1, wherein the optical fiber has a zero chromatic dispersion slope value (ZDS) at the zero chromatic dispersion wavelength less than 0.092 ps/(nm²·km).

28. A buffer tube containing one or more optical fibers according to claim 1.

29. A cable containing one or more optical fibers according to claim 1.

30. An optical box receiving at least a portion of the optical fiber according to claim 1.

31. An optical box according to claim 30, wherein the optical fiber is positioned within the optical box such that the optical fiber has a radius of curvature less than 15 millimeters.

32. An optical box according to claim 30, wherein the optical fiber is positioned within the optical box such that the optical fiber has a radius of curvature less than 5 millimeters.

33. A Fiber-To-The-Home (FTTH) system comprising at least a portion of the optical fiber according to claim 1.

34. A single-mode optical fiber, comprising:
a central core surrounded by an outer optical cladding, the central core having a radius $r_1$ and a refractive index difference $\Delta n_1$ with the outer optical cladding between about $4.9 \times 10^{-3}$ and $5.7 \times 10^{-3}$;
an intermediate cladding positioned between the central core and the outer optical cladding, the intermediate cladding having a radius $r_2$ and a refractive index difference $\Delta n_2$ with the outer optical cladding between about $-0.1 \times 10^{-3}$ and $0.6 \times 10^{-3}$; and
a depressed trench positioned between the intermediate cladding and the outer optical cladding, the depressed trench having a radius $r_3$ and a refractive index difference $\Delta n_3$ with the outer optical cladding between about $-10.0 \times 10^{-3}$ and $-5.0 \times 10^{-3}$;
wherein, at a wavelength of 1310 nanometers, the optical fiber has a nominal mode field diameter (MFD) between about 8.6 microns and 9.5 microns;
wherein the optical fiber has a zero chromatic dispersion wavelength (ZDW) between 1300 nanometers and 1324 nanometers;
wherein the optical fiber has a zero chromatic dispersion slope value (ZDS) at the zero chromatic dispersion wavelength less than 0.092 ps/(nm²·km);
wherein, at a wavelength of 1550 nanometers, the optical fiber has bending losses less than about $3 \times 10^{-3}$ dB/turn for a radius of curvature of 15 millimeters and less than about 0.15 dB/turn for a radius of curvature of 5 millimeters;
wherein, at a wavelength of 1625 nanometers, the optical fiber has bending losses less than $10^{-2}$ dB/turn for a radius of curvature of 15 millimeters and less than about 0.25 dB/turn for a radius of curvature of 5 millimeters; and
wherein the optical fiber has both a standard cable cut-off wavelength of 1260 nanometers or less and a straight cable cut-off wavelength of 1260 nanometers or less.

35. The optical fiber according to claim 34, wherein:
the surface integral of the central core ($V_{01}$), defined as $$V_{01} = \int_0^{r1} \Delta n(r) \cdot dr \approx r_1 \times \Delta n_1,$$

is between $19.0 \times 10^{-3}$ micron and $23.0 \times 10^{-3}$ micron;
the surface integral of the depressed trench ($V_{03}$), defined as $$V_{03} = \int_{r2}^{r3} \Delta n(r) \cdot dr \approx (r_3 - r_2) \times \Delta n_3,$$

is between $-55.0 \times 10^{-3}$ micron and $-30.0 \times 10^{-3}$ micron; and
the volume integral of the depressed trench ($V_{13}$), defined as $$V_{13} = 2 \cdot \int_{r2}^{r3} \Delta n(r) \cdot r \cdot dr \approx (r_3^2 - r_2^2) \times \Delta n_3,$$

is between $-1200 \times 10^{-3}$ µm² and $-750 \times 10^{-3}$ µm².

36. The optical fiber according to claim 34, wherein the central core has a radius ($r_1$) between about 3.8 microns and 4.35 microns.

37. The optical fiber according to claim 34, wherein the intermediate cladding has a radius ($r_2$) between about 8.5 microns and 9.7 microns.

38. The optical fiber according to claim 34, wherein the depressed trench has a radius ($r_3$) between about 13.5 microns and 15 microns.

* * * * *

UNITED STATES PATENT AND TRADEMARK OFFICE
CERTIFICATE OF CORRECTION

PATENT NO. : 7,889,960 B2
APPLICATION NO. : 12/436484
DATED : February 15, 2011
INVENTOR(S) : Louis-Anne de Montmorillon et al.

It is certified that error appears in the above-identified patent and that said Letters Patent is hereby corrected as shown below:

Column 2, Line 34 reads "No. US2007/0280615 (and its counterpart European Patent" and should read "No. US2007/0280615, now U.S. Patent No. 7,587,111, (and its counterpart European Patent"

Column 2, Line 36 reads "Patent Application Publication No. US2007/0127878 (and its" and should read "Patent Application Publication No. US2007/0127878, now U.S. Patent No. 7,623,747, (and its"

Column 3, Line 4 reads "U.S. Patent Application Publication No. US2007/0280615" and should read "U.S. Patent Application Publication No. US2007/0280615, now U.S. Patent No. 7,587,111,"

Column 3, Line 7 reads "012787 (and its counterpart European Patent Application" and should read "012787, now U.S. Patent No. 7,623,747 (and its counterpart European Patent Application"

Column 5, Line 29 reads "mode after propagation over five meters of fiber. Cut-off" and should read "after propagation over five meters of fiber. Cut-off"

Column 14, Table IV, in the row labeled "SSMF1, under the column labeled "R=7.5 mm, the datum reads "6.9E-00" and should read "6.9E+00"

Column 16, Line 64 reads "Optical Fiber, filed Nov. 10, 2008, (Overton)." and should read "Optical Fiber, filed Nov. 10, 2008, (Overton) and published as U.S. Patent Application Publication No. 2009/0175583."

Column 17, Line 15 reads "Fiber (de Montmorillon et al.); U.S. Patent Application Pub-" and should read "Fiber (de Montmorillon et al.), now U.S. Patent No. 7,623,747; U.S. Patent Application Pub-"

Signed and Sealed this
Thirty-first Day of January, 2012

David J. Kappos
*Director of the United States Patent and Trademark Office*

CERTIFICATE OF CORRECTION (continued)
U.S. Pat. No. 7,889,960 B2

Column 17, Line 18 reads "Fiber (de Montmorillon et al.); U.S. Patent No. 7,356,234 for"
and should read "Fiber (de Montmorillon et al.), now U.S. Patent No. 7,587,111; U.S. Patent No. 7,356,234 for"

Column 17, Line 24 reads "Optical Fiber (Flammer et al.); U.S. patent application Ser."
and should read "Optical Fiber (Flammer et al.), now U.S. Patent No. 7,555,186; U.S. patent application Ser."

Column 17, Line 28 reads "al.); U.S. Patent Application No. 61/101,337 for a Bend-"
and should read "al.), now published as U.S. Patent Application Publication No. 2009/0252469; U.S. Patent Application No. 61/101,337 for a Bend-"

Column 17, Line 37 reads "filed May 6, 2009, (de Montmorillon et al.)."
and should read "filed May 6, 2009, (de Montmorillon et al.), now published as U.S. Patent Application Publication No. US2009/0279835."

Column 18, Line 44 reads "curable material, is typically less about 1,000 microns (e.g.,"
and should read "curable material, is typically less than about 1.000 microns (e.g.,"

Column 21, Line 4 reads "ton et al.), each of which is hereby incorporated by reference"
and should read "ton et al.), now U.S. Patent No. 7,515,795, ~~each of~~ which is hereby incorporated by reference"

Column 21, Line 16 reads "(Overton et al.), which is hereby incorporated by reference in"
and should read "(Overton et al), now U.S. Patent No. 7,599,589, which is hereby incorporated by reference in"

Column 21, Line 34 reads "(Parris et al.), which is hereby incorporated by reference in its"
and should read "(Parris et al.), now U.S. Patent No. 7,724,998, which is hereby incorporated by reference in its"

Column 22, Line 34 reads "tion Method (Lock et al.), and U.S. Patent Application Pub-"
and should read "tion Method (Lock et al.), now U.S. Patent No. 7,574,095, and U.S. Patent Application Pub-"

Column 22, Line 37 reads "(Griffioen et al.), each of which is incorporated by reference"
and should read "(Griffioen et al.), now U.S. Patent No. 7,665,902, each of which is incorporated by reference"

Column 22, Line 57 reads "duct's or ~~microducts~~ inner diameter."
and should read "duct's or microduct's inner diameter."

Column 23, Line 6 reads "skill in the art. (~~Figure-eight~~ cables and other designs can be"
and should read "skill in the art. Figure-eight cables and other designs can be"

CERTIFICATE OF CORRECTION (continued)
U.S. Pat. No. 7,889,960 B2

Column 25, Line 33 reads "al.); U.S. Patent Application Publication No. US 2008/"
and should read "al.), now U.S. Patent No. 7,570,852; U.S. Patent Application Publication No. US 2008/"

Column 25, Line 35 reads "(Tatat); U.S. Patent Application Publication No. US2008/"
and should read "(Tatat), now U.S. Patent No. 7,646,954; U.S. Patent Application Publication No. US2008/"

Column 25, Line 37 reads "Coupled Optical Element (Overton et al.); U.S. Patent Applic-"
and should read "Coupled Optical Element (Overton et al.), now U.S. Patent No. 7,599,589; U.S. Patent Appli-"

Column 25, Line 39 reads "Cable Having a Water-Swellable Element (Overton); U.S."
and should read "Cable Having a Water-Swellable Element (Overton), now U.S. Patent No. 7,567,739; U.S."

Column 25, Line 44 reads "Having a Deformable Coupling Element (Parris et al.); U.S."
and should read "Having a Deformable Coupling Element (Parris et al.), now U.S. Patent No. 7,639,915; U.S."

Column 25, Line 47 reads "(Parris); U.S. Patent Application Publication No. US2009/"
and should read "(Parris), now U.S. Patent No. 7,646,952; U.S. Patent Application Publication No. US2009/"

Column 25, Line 49 reads "Cables (Parris et al.); and U.S. patent application Ser. No."
and should read "Cables (Parris et al.), now U.S. Patent No. 7,724,998; and U.S. patent application Ser. No."

Column 25, Line 51 reads "Feb. 24, 2009, (Lookadoo et al.)."
and should read "Feb, 24, 2009, (Lookadoo et al.) and published as U.S. Patent Application Publication No. US2009/0214167."

UNITED STATES PATENT AND TRADEMARK OFFICE
CERTIFICATE OF CORRECTION

PATENT NO. : 7,889,960 B2
APPLICATION NO. : 12/436484
DATED : February 15, 2011
INVENTOR(S) : Louis-Anne de Montmorillon et al.

It is certified that error appears in the above-identified patent and that said Letters Patent is hereby corrected as shown below:

Column 2, Line 34 reads "No. US2007/0280615 (and its counterpart European Patent" and should read "No. US2007/0280615, now U.S. Patent No. 7,587,111, (and its counterpart European Patent"

Column 2, Line 36 reads "Patent Application Publication No. US2007/0127878 (and its" and should read "Patent Application Publication No. US2007/0127878, now U.S. Patent No. 7,623,747, (and its"

Column 3, Line 4 reads "U.S. Patent Application Publication No. US2007/0280615" and should read "U.S. Patent Application Publication No. US2007/0280615, now U.S. Patent No. 7,587,111,"

Column 3, Line 7 reads "012787 (and its counterpart European Patent Application" and should read "012787, now U.S. Patent No. 7,623,747 (and its counterpart European Patent Application"

Column 5, Line 29 reads "mode after propagation over five meters of fiber. Cut-off" and should read "after propagation over five meters of fiber. Cut-off"

Column 14, Table IV, in the row labeled "SSMF1, under the column labeled "R=7.5 mm, the datum reads "6.9E-00" and should read "6.9E+00"

Column 16, Line 64 reads "Optical Fiber, filed Nov. 10, 2008, (Overton)." and should read "Optical Fiber, filed Nov. 10, 2008, (Overton) and published as U.S. Patent Application Publication No. 2009/0175583."

This Certificate superseded the Certificate of Correction issued January 31, 2012.

Signed and Sealed this
First Day of May, 2012

David J. Kappos
*Director of the United States Patent and Trademark Office*

CERTIFICATE OF CORRECTION (continued)
U.S. Pat. No. 7,889,960 B2

Column 17, Line 15 reads "Fiber (de Montmorillon et al.); U.S. Patent Application Pub-"
and should read "Fiber (de Montmorillon et al.), now U.S. Patent No. 7,623,747; U.S. Patent Application Pub-"

Column 17, Line 18 reads "Fiber (de Montmorillon et al.); U.S. Patent No. 7,356,234 for"
and should read "Fiber (de Montmorillon et al.), now U.S. Patent No. 7,587,111; U.S. Patent No. 7,356,234 for"

Column 17, Line 24 reads "Optical Fiber (Flammer et al.); U.S. patent application Ser."
and should read "Optical Fiber (Flammer et al.), now U.S. Patent No. 7,555,186; U.S. patent application Ser."

Column 17, Line 28 reads "al.); U.S. Patent Application No. 61/101,337 for a Bend-"
and should read "al.), now published as U.S. Patent Application Publication No. 2009/0252469; U.S. Patent Application No. 61/101,337 for a Bend-"

Column 17, Line 37 reads "filed May 6, 2009, (de Montmorillon et al.)."
and should read "filed May 6, 2009, (de Montmorillon et al.), now published as U.S. Patent Application Publication No. US2009/0279835."

Column 18, Line 44 reads "curable material, is typically less about 1,000 microns (e.g.,"
and should read "curable material, is typically less than about 1,000 microns (e.g.,"

Column 21, Line 4 reads "ton et al.), each of which is hereby incorporated by reference"
and should read "ton et al.), now U.S. Patent No. 7,515,795, each of which is hereby incorporated by reference"

Column 21, Line 16 reads "(Overton et al.), which is hereby incorporated by reference in"
and should read "(Overton et al), now U.S. Patent No. 7,599,589, which is hereby incorporated by reference in"

Column 21, Line 34 reads "(Parris et al.), which is hereby incorporated by reference in its"
and should read "(Parris et al.), now U.S. Patent No. 7,724,998, which is hereby incorporated by reference in its"

Column 22, Line 34 reads "tion Method (Lock et al.), and U.S. Patent Application Pub-"
and should read "tion Method (Lock et al.), now U.S. Patent No. 7,574,095, and U.S. Patent Application Pub-"

Column 22, Line 37 reads "(Griffioen et al.), each of which is incorporated by reference"
and should read "(Griffioen et al.), now U.S. Patent No. 7,665,902, each of which is incorporated by reference"

Column 22, Line 57 reads "duct's or microducts inner diameter."
and should read "duct's or microduct's inner diameter."

CERTIFICATE OF CORRECTION (continued)
U.S. Pat. No. 7,889,960 B2

Column 23, Line 6 reads "skill in the art. (Figure-eight cables and other designs can be" and should read "skill in the art. Figure-eight cables and other designs can be"

Column 25, Line 33 reads "al.); U.S. Patent Application Publication No. US 2008/" and should read "al.), now U.S. Patent No. 7,570,852; U.S. Patent Application Publication No. US 2008/"

Column 25, Line 35 reads "(Tatat); U.S. Patent Application Publication No. US2008/" and should read "(Tatat), now U.S. Patent No. 7,646,954; U.S. Patent Application Publication No. US2008/"

Column 25, Line 37 reads "Coupled Optical Element (Overton et al.); U.S. Patent Applic-" and should read "Coupled Optical Element (Overton et al.), now U.S. Patent No. 7,599,589; U.S. Patent Appli-"

Column 25, Line 39 reads "Cable Having a Water-Swellable Element (Overton); U.S." and should read "Cable Having a Water-Swellable Element (Overton), now U.S. Patent No. 7,567,739; U.S."

Column 25, Line 44 reads "Having a Deformable Coupling Element (Parris et al.); U.S." and should read "Having a Deformable Coupling Element (Parris et al.), now U.S. Patent No. 7,639,915; U.S."

Column 25, Line 47 reads "(Parris); U.S. Patent Application Publication No. US2009/" and should read "(Parris), now U.S. Patent No. 7,646,952; U.S. Patent Application Publication No. US2009/"

Column 25, Line 49 reads "Cables (Parris et al.); and U.S. patent application Ser. No." and should read "Cables (Parris et al.), now U.S. Patent No. 7,724,998; and U.S. patent application Ser. No."

Column 25, Line 51 reads "Feb. 24, 2009, (Lookadoo et al.)." and should read "Feb, 24, 2009, (Lookadoo et al.) and published as U.S. Patent Application Publication No. US2009/0214167."